US012578632B2

(12) United States Patent
Tarpan et al.

(10) Patent No.: US 12,578,632 B2
(45) Date of Patent: Mar. 17, 2026

(54) EFFICIENT LIGHT ENGINE SYSTEMS

(71) Applicant: BARCO N.V., Kortrijk (BE)

(72) Inventors: Mihaela Tarpan, Lochristi (BE); Bart Maximus, Oudenaarde (BE); Kristiaan Neyts, Ghent (BE)

(73) Assignee: BARCO N.V., Kortrijk (BE)

( * ) Notice: Subject to any disclaimer, the term of this patent is extended or adjusted under 35 U.S.C. 154(b) by 760 days.

(21) Appl. No.: 17/785,802

(22) PCT Filed: Dec. 15, 2020

(86) PCT No.: PCT/EP2020/086118
§ 371 (c)(1),
(2) Date: Jun. 15, 2022

(87) PCT Pub. No.: WO2021/122527
PCT Pub. Date: Jun. 24, 2021

(65) Prior Publication Data
US 2023/0093084 A1 Mar. 23, 2023

(30) Foreign Application Priority Data
Dec. 16, 2019 (NL) ...................................... 2024469

(51) Int. Cl.
*G03B 21/20* (2006.01)
*G02B 19/00* (2006.01)
(52) U.S. Cl.
CPC ....... *G03B 21/204* (2013.01); *G02B 19/0023* (2013.01); *G03B 21/2066* (2013.01)
(58) Field of Classification Search
None
See application file for complete search history.

(56) References Cited

U.S. PATENT DOCUMENTS 6,356,700 B1    3/2002   Strobl
7,547,114 B2    6/2009   Li et al.
(Continued)

FOREIGN PATENT DOCUMENTS

CN    102707551 A    10/2012
CN    102854723 A    1/2013
(Continued)

OTHER PUBLICATIONS

Office Action issued in Chinese Application No. 202080087302.0, dated Nov. 8, 2024.
(Continued)

*Primary Examiner* — Bao-Luan Q Le
*Assistant Examiner* — Danell L Owens
(74) *Attorney, Agent, or Firm* — HSML P.C.

(57) ABSTRACT

An angle selective filter for a light projection system including a wavelength conversion material illuminated by an excitation light source in a first wavelength range, the wavelength conversion material re-emitting light in a second wavelength range after excitation by the light in the first wavelength range. The filter is configured to have a first average transmission which is high for light in the first wavelength range and for angles of incidence in the range $[\gamma_1,\gamma_2]$, in a third wavelength range, the filter is configured to have a second average transmission which is high for light having an incidence angle in the range $[\beta_1,\beta_2]$, and a third average reflectivity which is high for light having an incidence angle in the range $[\beta_2,\beta_3]$, after reflection on the wavelength conversion material.

18 Claims, 15 Drawing Sheets

(56)     References Cited

U.S. PATENT DOCUMENTS

| | | | |
|---|---|---|---|
| 8,388,190 B2 | 3/2013 | Li et al. | |
| 10,344,947 B2 | 7/2019 | Yamae | |
| 2007/0081336 A1 | 4/2007 | Bierhuizen et al. | |
| 2009/0034284 A1 | 2/2009 | Li et al. | |
| 2016/0290604 A1 | 10/2016 | Hikmet et al. | |
| 2018/0119896 A1* | 5/2018 | Hikmet | H05B 33/145 |
| 2019/0003681 A1 | 1/2019 | Yamae | |
| 2019/0064644 A1* | 2/2019 | Okumura | G03B 21/204 |

FOREIGN PATENT DOCUMENTS

| | | | |
|---|---|---|---|
| CN | 103592776 A | 2/2014 | |
| CN | 103631078 A | 3/2014 | |
| CN | 108681198 A | 10/2018 | |
| CN | 108781279 A | 11/2018 | |
| CN | 209248238 U | 8/2019 | |
| CN | 110398798 A | 11/2019 | |
| EP | 1194718 B1 | 3/2007 | |
| WO | 2016156399 A1 | 10/2016 | |
| WO | 2017175148 A1 | 10/2017 | |

OTHER PUBLICATIONS

Office Action issued in Chinese Application No. 202080087302.0, dated Apr. 23, 2024, with English translation.

International Search Report and Written Opinion issued in PCT/EP2020/086118, dated Mar. 9, 2021, 8 pages provided.

Office Action issued Chinese Application No. 202080087302.0, mailed Jun. 27, 2025, with English translation.

Office Action issued in Chinese Application No. 202080087302.0, mailed Apr. 14, 2025, with English translation.

\* cited by examiner

Wavelength (nm)

A    B

EFFICIENT LIGHT ENGINE SYSTEMS

TECHNICAL FIELD

The invention relates to the field of light engines. The invention relates generally to highly efficient, radiant power transferring, light engines and, in particular, to projection display systems, and to the design optimization of related components.

BACKGROUND

A Light Engine (LE) is an apparatus typically made up of multiple optical components that collect light from a source S, and deliver the collected light to a target T (like e.g. a light valve).

It is preferred that light is captured from the source S and delivered to the target T as efficiently as possible. The light has, in particular, any wavelength relevant to projection display systems.

One of the most important specification of a digital projector is its brightness. The brightness of a projector, typically expressed via its light luminous flux (measured in ANSI lumens), describes the amount of light a projector produces. Brightness is important for the image quality and the viewing experience at home, at the office or at the cinema.

To estimate the maximum achievable projector lumen output ($\Phi_{projector}$) prior to building a prototype, or even prior to detailed design of a prototype, one must know:

The efficiency of the light engine ($\eta$)
The average luminance of the source ($L_{source}$)
The maximum etendue limit of the system ($E_{max}$)

$$\Phi_{projector} = \eta \cdot L_{source} \cdot E_{max}$$

For an etendue-limited system where $E_{max}$ is fixed, the only ways to increase the brightness of a projector is by:

Improving the efficiency of the light engine ($\eta$)
Increase the luminance of the source ($L_{source}$)

One way to increase the luminance of the source is by combining multiple light sources within the given etendue through:

Polarization combination—two beams with different orthogonal polarization are combined into one by using a polarizing beam splitter (used "in reverse" as polarization combiner).

Wavelength combination—if the wavelengths of the beams are sufficiently different than we can combine them using a dichroic filter.

Spatial combination—this is a method typically used in the full laser light sources or LED light sources in which the lasers or the LEDs are "compacted" by removing the space between them.

Temporal combination—this is a method typically used for LEDs and it relies on the fact that in pulse mode the LEDs can be driven at higher power therefore you can temporally multiplex the LEDs in the same given etendue.

These solutions are not necessarily applicable when one wants a simpler and/or more compact design.

Another way to increase the luminance of a source is by "recycling light" as disclosed in e.g. U.S. Pat. No. 6,356, 700B1" Efficient light engine systems, components and methods of manufacture" or EP1194718B1 "Collecting and condensing optical system using cascaded parabolic reflectors".

Light recycling can be used when the source doesn't absorb its own radiation. Part of the light from the source is redirected towards the source itself and then reflected within the same etendue. The reflected light is added to the light that was not reflected back to the source, therefore increasing its apparent luminance.

However, as can be seen on FIG. 1, a parabolic reflector (PR) will increase the size of the light engine which is not necessarily desirable when the end-user expects a compact, smaller sized projector. The reflector may also be of a different type such as spherical or elliptical, etc.

The last decade has seen a marked transition from lamps to solid state illumination as light sources in projectors. While solid state illumination differs in many ways from the arc lamps, the light emitted by a laser-phosphor light source has a lot of commonalities with the light emitted by a lamp: e.g. it is broadband, unpolarised and the phosphor behaves like a Lambertian emitter. A phosphor also emits light over a large range of angles, contrary to a directive light source that emits light into a smaller range of angles.

These commonalities make it very difficult to increase the luminance of the laser phosphor light source by combining multiple light sources.

The light emitted by the phosphor is unpolarised therefore polarisation combination cannot be used.

The laser-phosphor light source is a rather broadband source as it can be seen from the typical optical spectrum presented in FIG. 2. In a laser-phosphor projector, a blue laser is used to excite a phosphor convertor and generate yellow light. Direct blue laser light is added to the phosphor yellow light and therefore creates a white source. The white light can then generate Red, Green and Blue primaries with the help of color filters. Alternatively, a blue excitation light can excite a red phosphor that generates red light and a green phosphor to generate green light.

The emission angle of a laser—phosphor light source is as large as that of a lamp. A phosphor conversion material is a Lambertian emitter emitting in 360°. If the phosphor layer is placed (e.g. glued or soldered) on a reflective substrate, the emission angle will be 180°. Therefore the etendue of a laser—phosphor source tends to be very high, making spatial combination for this type of extended light sources almost impossible.

U.S. Pat. No. 8,388,190 "Illumination system and method for recycling light to increase the brightness of the light source" describes a light source where a conventional reflector is used to spatially and/or angularly recycle the light emitted by the phosphor layer in an LED as illustrated on FIG. 3. The device spatially recycles a portion of rays of light emitted by the LED back to the light source using a reflector or mirror and/or angularly recycles high angle rays of light and transmits small angle rays of light, thereby increasing the brightness of the light sources output.

However there are two main disadvantages or shortcomings to this idea:

The reflector is very bulky and it adds significant volume to the light source.

There is no wavelength filtering. The reflector is color agnostic.

There is a need for improvement in the art.

SUMMARY

This invention relates to systems and methods to increase the luminance of a light source that uses a wavelength conversion material (e.g. a phosphor) in combination with an excitation light source (e.g. LED or laser) by using a specially designed optical filter (e.g. an interference filter like a diffractive Bragg reflector) to recycle a part of the light emitted by the phosphor, especially at larger emission angles, and to re-emit that light under a smaller emission angle.

Therefore, there is provided an angle selective filter for a light projection system comprising a wavelength conversion material provided on a reflective surface, an excitation light source emitting light in a first wavelength range, the excitation light source being configured to illuminate the wavelength conversion material, the wavelength conversion material re-emitting light in a second wavelength range after excitation by the light in the first wavelength range, wherein said re-emitted light is re-emitted in reflection by the reflective surface, and a light collection optics configured to receive at least a portion of the light re-emitted by the wavelength conversion material within an acceptance cone defined by an angle $\alpha_{Max}$. The angle selective filter is arranged to be provided in the light path between the light collection optics and the wavelength conversion material. The filter is configured to have a first average transmission which is high for light in the first wavelength range and for angles of incidence in the range $[\gamma_1,\gamma_2]$. The high average first transmission is at least in a direction through the filter towards the wavelength conversion material. The filter is configured to have, in a third wavelength range, a second average transmission which is high for light having an incidence angle in the range $[\beta_1,\beta_2]$. The filter is configured to have a third average reflectivity which is high for light having an incidence angle in the range $[\beta_2,\beta_3]$, after reflection on the wavelength conversion material, wherein $\beta_1 < \beta_2 < \beta_3$. The high average second transmission is at least in a direction through the filter away from the wavelength conversion material. The high average third reflectivity is for light coming from the direction of the wavelength conversion material. With high average transmission here is meant a transmission whose average over the angular range specified is at least 80%, preferably more than 90% or 95%, and more preferably more than 98%. With high average reflectivity here is meant a reflectivity whose average is of at least 80%, preferably more than 90% or 95%, and more preferably more than 98% over the specified angular ranges.

The requirements defined above on the filter can be mathematically expressed as follows. The figure of merit of the filter can be defined by $$G = \frac{\int_{\lambda_1}^{\lambda_2} F(\lambda)P(\lambda)d\lambda}{\int_{\lambda_1}^{\lambda_2} P(\lambda)d\lambda} \times T_{\lambda_{ex}},$$

wherein $T_{\lambda_{ex}}$ represents the average transmission at (or around) the dominant excitation wavelength, within the cone of light whose incidence angle is in the range $[\gamma_1,\gamma_2]$, $$T_{\lambda_{ex}} = \frac{\int_{\gamma_1}^{\gamma_2} T(\lambda_{ex}, \theta)\sin(\theta)d\theta}{\int_{\gamma_1}^{\gamma_2} \sin(\theta)d\theta}.$$

$F(\lambda)$ is a wavelength dependent figure of merit defined by the ratio of the average transmission within a first range of incident angles $[\beta_1,\beta_2]$ and the average transmission within a second range of incident angle $[\beta_2,\beta_3]$ outside the first range, $$F(\lambda) = \frac{\dfrac{\int_{\beta_1}^{\beta_2} T(\lambda, \theta)\cos(\theta)\sin(\theta)d\theta}{\int_{\beta_1}^{\beta_2} \cos(\theta)\sin(\theta)d\theta}}{\dfrac{\int_{\beta_2}^{\beta_3} T(\lambda, \theta)\cos(\theta)\sin(\theta)d\theta}{\int_{\beta_2}^{\beta_3} \cos(\theta)\sin(\theta)d\theta}},$$

$P(\lambda)$ is the spectral density.

Thus, the above requirements can be mathematically expressed as $T_{\lambda_{ex}} \geq 80\%, 90\%, 95\%$, or 98%.

Average transmission in the angular range $[\beta_1,\beta_2]$:

$$\frac{\int_{\beta_1}^{\beta_2} T(\lambda, \theta)\cos(\theta)\sin(\theta)d\theta}{\int_{\beta_1}^{\beta_2} \cos(\theta)\sin(\theta)d\theta} \geq 80\%, 90\%, 95\% \text{ or } 98\%.$$

Average reflection in the angular range $[\beta_2,\beta_3]$:

$$\frac{\int_{\beta_2}^{\beta_3} R(\lambda, \theta)\cos(\theta)\sin(\theta)d\theta}{\int_{\beta_2}^{\beta_3} \cos(\theta)\sin(\theta)d\theta} \geq 80\%, 90\%, 95\% \text{ or } 98\%.$$

Note that the absorption is neglected as in this type of filter the absorption is assumed to be almost null.

By reducing the angle of the reflected light at the surface of the wavelength conversion material, the etendue is reduced (in comparison to a system without such a filter). In a system without a filter as described in the present invention, it is mandatory to operate very close to the quenching limit of the wavelength conversion material because so much laser power needs to be concentrated on such a small area of the wavelength conversion element. By decreasing the angle of the reflected light at the surface of the wavelength conversion material from 90° to $\beta_2$, the illumination area on the wavelength conversion element can be increased, e.g. by a factor two (if $\beta_2=45°$), which will decrease the power density, e.g. by a factor two, as well. The performance of the wavelength conversion material then drastically improves.

The wavelength conversion element will thus be automatically more efficient at lower power densities, and the luminance of the source can be reduced for a similar result.

A further advantage of the invention is that the filter can replace bulky parabolic reflectors and allows for a more compact light engine.

Preferably, at least one of the angles $\gamma_1$ is 0, $\beta_1$ is 0, and $\beta_3$ is 90°.

Advantageously, the light is incident on the wavelength conversion element orthogonally and/or light is reflected orthogonally.

Advantageously, $\gamma_2$ is substantially smaller than $\beta_2$.

For an interference filter, such as a DBR filter, which has to be designed such that it has a certain angle selectivity in a first wavelength range, for instance for green (converted) light, it will be a very hard if not impossible job to design it so that it will be e.g. 90% transmissive for all angles of the blue exciting light. To make the filter design possible and feasible, this requirement should be restricted to the angles which matter.

Because the incoming excitation light for projectors is (typically) laser light with a low étendue, it is possible to keep the angular spread really limited.

The smaller the incidence angles of the light source (or the smaller the etendue of the light source), the smaller the angle $\gamma_2$ can be in the filter, and the easier it is to manufacture a filter with a high transmission for the first wavelength range. Furthermore, increasing the illumination spot on the wavelength conversion material allows to further decrease the angle $\gamma_2$.

It is an advantage that the angle $\beta_2$ of the filter is in the range of [0°, 65°], preferably substantially 45°.

An angle of substantially 45° could easily be achieved when manufacturing the filter and still provide a reasonable efficiency result. Theoretically, the smaller the angle, the better. Above 65° could provide too much light losses.

Preferably, the angle $\alpha_{Max}$ defining the acceptance cone of the light collection optics is greater or equal to the angle $\beta_2$ of the filter, and is preferably equal to the angle $\beta_2$ of the filter.

It is an advantage if the incidence angle $\gamma_2$ is in the range [0°, 35°].

This angle depends mostly on the optical design of the illumination source.

Advantageously, the third wavelength range is a subset of the second wavelength range.

The second wavelength is what the wavelength conversion element emits, for the most relevant application of a yellow phosphor for instance 500 nm to 650 nm. The third wavelength range is what the projector "uses", for instance in some applications only green from i.e. 520 to 580 nm.

Preferably, the third wavelength range is defined by the wavelength range of at least one of the green or red primary colour of the projection system.

It is an advantage that the wavelength conversion element emits yellow, green light, or red light, and the third wavelength range which is a primary colour of the projection system is a subset of this light.

It is an advantage that at least one of the first transmission or the second transmission is larger than 90% or 95% and preferably larger than 98%.

Improving the first and/or second transmission of the filter impacts directly on the efficiency of the projection system, as it reduces the light losses.

Preferably, the third reflectivity is larger than 90% or 95% and preferably larger than 98%.

This third reflectivity determines the amount of light which is recycled and finally converted by the wavelength conversion material. Thus, this parameter also impacts on the efficiency of the projection system.

Optionally, the filter is coated on a second side of a transparent substrate, wherein the transparent substrate is configured such that a first side faces the light collection optics, and the second side faces the wavelength conversion material.

Coating a filter on a substrate is simple to implement.

Advantageously, the filter is provided in the projection system at a distance D1 from the surface of the wavelength conversion material, wherein the distance D1 is at most 5 mm, preferably at most 2 mm, and even more preferably at most 1 mm.

Reducing the distance has the advantage of also reducing the light losses.

Optionally, the filter is coated on top of the wavelength conversion material. From a structural point of view, this solution is preferred as it is less complex, there are less components, a better spot confinement, and less light losses.

Preferably, the excitation light source is at least one of a laser light source, preferably a blue laser or a UV laser, a LED light source or a lamp.

Advantageously, the first wavelength range is in the interval [420 nm-500 nm], or preferably in the interval [440 nm-470 nm], and even more preferably in the interval [450 nm, 460 nm] and the full with at half maximum is in the range of 1 nm to 30 nm.

Alternatively, the first wavelength range is in the interval [350 nm-420 nm] and the full width at half maximum is in the interval of 1 nm to 30 nm.

Advantageously, the wavelength conversion material is a photoluminescent material.

Optionally, the photoluminescent material is of the type YAG:Ce.

Optionally, the photoluminescent material is of the type LuAG:Ce.

Optionally, the photoluminescent material is of the type nitride or oxynitride (e.g. $(Ca,Sr,Ba)Si_2O_2N_2:Eu^{2+}$ or $CaAlSiN_3:Eu^{2+}$)

Optionally, the wavelength conversion material comprises quantum dots or quantum platelets.

Advantageously, according to an aspect there is also provided an illumination source comprising the filter described above.

According to an aspect, there is also provided a light projection system comprising the filter described above or the illumination source as described above.

It is to be understood that both the foregoing general description and the following detailed description are exemplary, and are intended to provide further explanation of the invention as claimed. It will be appreciated that any of the aspects, features and options described in view of the filter apply equally to the illumination source and the light projection system. It will also be clear that any one or more of the aspects, features and options described herein can be combined. Other advantages and features of the invention will be apparent from the following description, drawings and claims.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
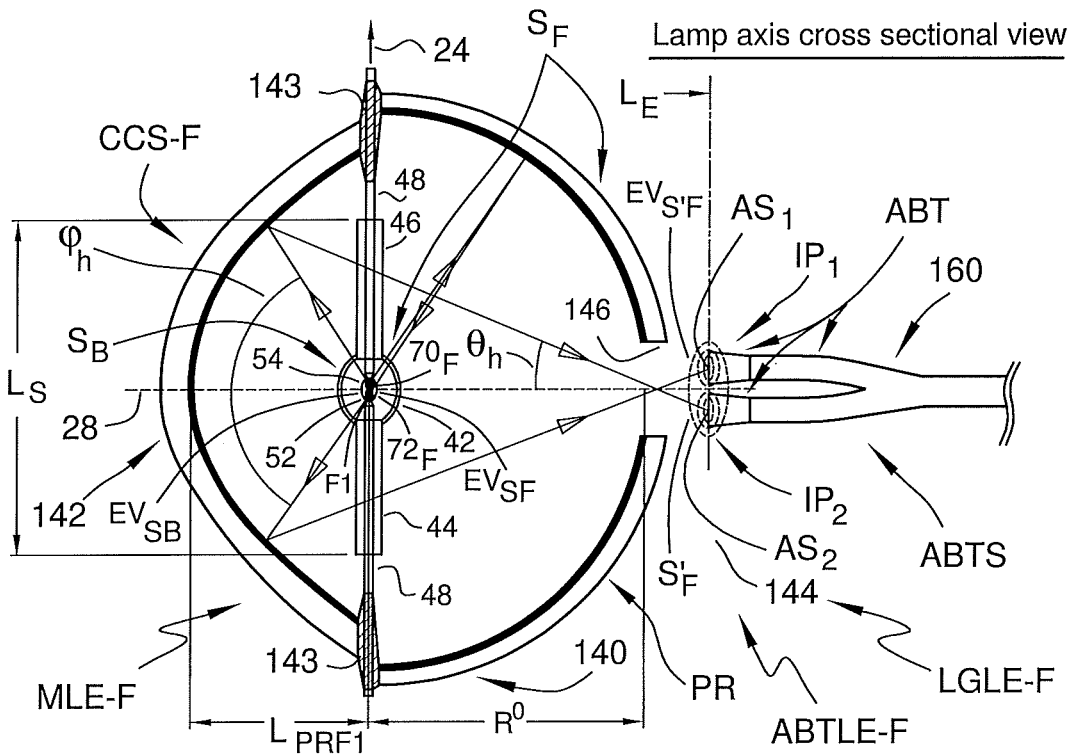
FIG. 1 shows an example of light recycling light engine according to the prior art.
Figure 2:
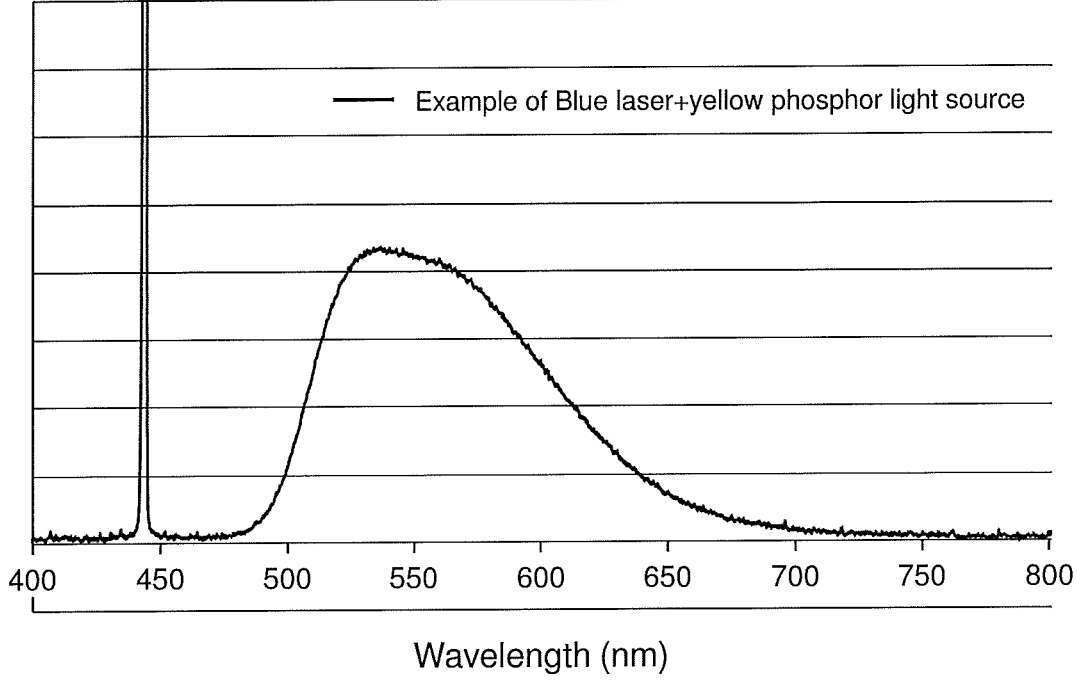
FIG. 2 shows an example of spectrum for a light source using a laser and a phosphor.
Figure 3:
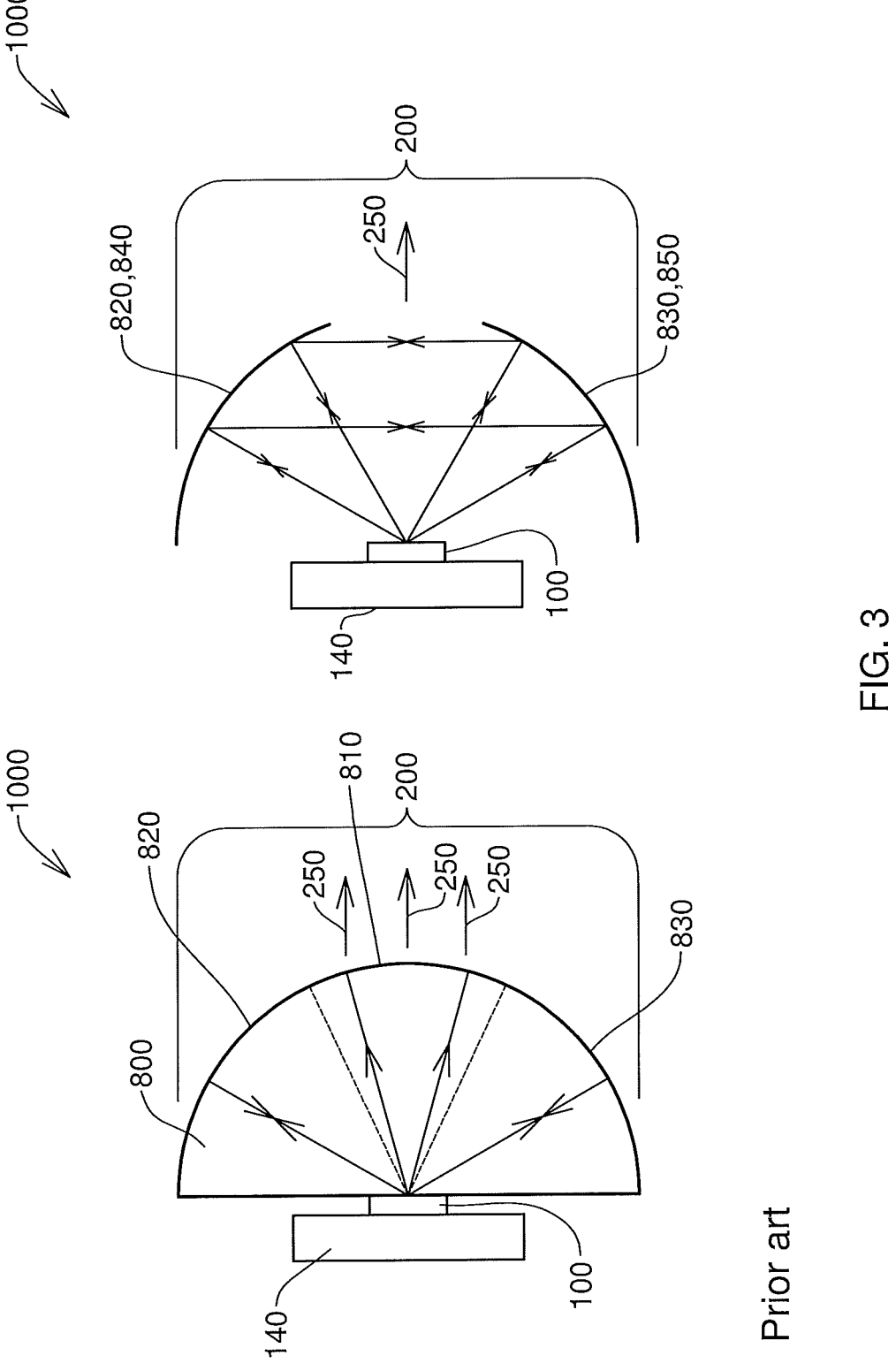
FIG. 3 shows another example of light engine with light recycling and angle filtering according to the prior art.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The terms "about" or "approximate" and the like are synonymous and are used to indicate that the value modified by the term has an understood range associated with it, where the range can be +20%, +15%, +10%, +5%, or +1%. The term "substantially" is used to indicate that a result (e.g., measurement value) is close to a targeted value, where close can mean, for example, the result is within 80% of the value, within 90% of the value, within 95% of the value, or within 99% of the value.

Definitions and Acronyms

Angle of incidence. In this text the angle of incidence is used for both the incidence of the excitation light on the phosphor material and the filter and for the incidence of the emitted light on the filter.

Angle of emission. The emission angle or the angle of emission is defined as the angle of the light emitted by a wavelength converting element for any absorbed wavelength. A typical phosphor material is a Lambertian emitting material therefore the angle of emission is 360°.

ANSI Lumen. The light output of projectors (including video projectors) is typically measured in lumens. A standardized procedure for testing projectors has been established by the American National Standards Institute, which involves averaging together several measurements taken at different positions. For marketing purposes, the luminous flux of projectors that have been tested according to this procedure may be quoted in "ANSI lumens", to distinguish them from those tested by other methods. ANSI lumen measurements are in general more accurate than the other measurement techniques used in the projector industry. This allows projectors to be more easily compared on the basis of their brightness specifications.

The method for measuring ANSI lumens is defined in the IT7.215 document which was created in 1992. First the projector is set up to display an image in a room at a temperature of 25 degrees Celsius. The brightness and contrast of the projector are adjusted so that on a full white field, it is possible to distinguish between a 5% screen area block of 95% peak white, and two identically sized 100% and 90% peak white boxes at the centre of the white field. The light output is then measured on a full white field at nine specific locations around the screen and averaged. This average is then multiplied by the screen area to give the brightness of the projector in "ANSI lumens".

Colour. In any of the embodiments of the present invention when reference is made to light sources such as lasers the "green" can be in the range 520-570 nm, "red" in the range 570-700 nm, and "blue" in the range 425-500 nm. With reference to lasers the bandwidth of an individual laser is very small hence a laser does not fill out the ranges for the colours but provides a narrow bandwidth within those ranges. Primary colours are sets of colours that can be combined to make a useful range of colours. For human applications, three primary colours are typically used, since human colour vision is usually trichromatic, but more colours can be used. For additive combination of colours in overlapping projected lights, the primary colours normally used are a red, a green, and a blue.

In an additive system, choices of sets of primary colours are nearly arbitrary, subject to weak constraints from the spectral sensitivities of each of the human cone photoreceptors, for example orange, green, and violet primaries have been used. The colour gamut obtained will be defined by the colour triangle defined by the choice of primaries.

Laser-illuminated projectors use arrays of laser sources illuminating a microdisplay engine comprising for example a spatial light modulator of which a DMD is one example. In the most common Laser Phosphor approach, a blue laser is used for creating the blue colour in the final image, but the blue laser is also used to illuminate a wavelength conversion device such as a yellow phosphor wheel, which emits yellow light. This yellow light is then split by a prism or colour wheel into green and red light. Maximum colour space is limited to the SMPTE standard, for example.

If a phosphor is used in such a way then the wavelength ranges for red or green may not fall within the wavelength ranges above.

Less than three primary colours can also be used. The choice of only one primary colour or two primary colours is preferably adapted to the photopic luminosity function of the eye.

When selecting the at least one primary colour, it is important to take into account the photopic luminosity function of the eye which describes the average spectral sensitivity human visual perception of brightness in day light. The peak of the photopic luminosity function is located at around 550-570 nm, which corresponds to the green primary colour.

Note that when projecting scenes with low luminosities, i.e. night scenes, it may be useful to use the scotopic luminosity function to select the primary colors whereby the peak moves to about 500 nm.

Brightness. The brightness of a projector, typically expressed via its light output (measured in ANSI lumens), describes the amount of light a projector produces. It is an attribute of visual perception in which a source appears to be radiating or reflecting light. In other words, brightness is the perception elicited by the luminance of a visual target. It is not necessarily proportional to luminance. This is a subjective attribute/property of an object being observed and one of the colour appearance parameters of colour appearance models.

Figure 10:
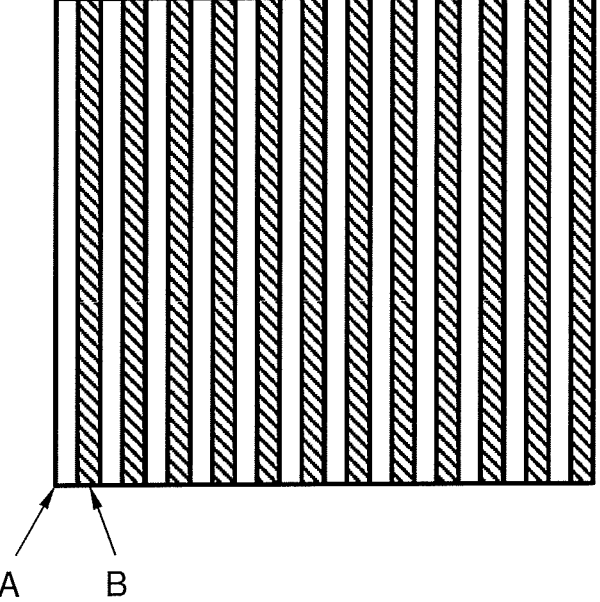
FIG. 10 is a schematic representation of a Distributed Bragg Reflector wherein the alternating layers are layer A and layer B.

Distributed Bragg Reflector. A distributed Bragg reflector (aka DBR) is a layered structure consisting of alternating high refractive index ($n_h$) and low refractive index ($n_l$) materials as illustrated on FIG. 10 where the alternating layers are layer A and layer B. The thickness ($d_h$ and $d_l$) of each level is calculated for the specific incidence wavelength ($\lambda$) as:

$$n_h d_h = n_l d_l = \frac{\lambda}{4}$$

A distributed Bragg reflector works on the principle of multiple reflections between high and low index materials interface. On every interface in the stack a part of the incident beam is reflected and if the incident wavelength is close to the designed wavelength (approximately four times the thickness of the layer) the many reflections will interfere constructively and the layers will act as a high quality reflector. The result is that a DBR acts as a wavelength selective element with the high reflection region of a DBR named the DBR stopband.

The performance of the multilayer DBR highly depends on the interface formed between the alternating layers. Therefore an appropriate sequencing of the layers of suitable dielectric materials and their thicknesses is critical for achieving the desired spectral response and application.

Typical materials with suitable refractive indices used for filter manufacturing are titanium dioxide ($TiO2$) for its high refractive index value (2.5) and silicon dioxide ($SiO2$) as a low refractive index layer (1.45). $TiO2$ is a dielectric material with a wide band-gap energy and high refractive index that can make it useful in the fabrication of multilayer thin films due to its high optical properties. For instance, its high transmittance and high refractive index in the visible region (380-760 nm) make it valuable to be employed in the production of the optical filter according to the invention.

DMD. Digital MicroMirror Device; is an example of light valve or spatial light modulator.

Etendue or etendue. A property of light in an optical system, which characterizes how "spread out" the light is in area and angle. It corresponds to the beam parameter product (BPP) in Gaussian optics.

From the source point of view, it is the product of the area of the source and the solid angle that the system's entrance pupil subtends as seen from the source. Equivalently, from the system point of view, the etendue equals the area of the entrance pupil times the solid angle the source subtends as seen from the pupil. These definitions must be applied for infinitesimally small "elements" of area and solid angle, which must then be summed over both the source and the diaphragm as shown below. Etendue may be considered to be a volume in phase space. Etendue is important because it never decreases in any optical system where optical power is conserved. A perfect optical system produces an image with the same etendue as the source. The etendue is related to the Lagrange invariant and the optical invariant, which share the property of being constant in an ideal optical system. The radiance of an optical system is equal to the derivative of the radiant flux with respect to the etendue.

The term étendue comes from the French étendue géométrique, meaning "geometrical extent". Other names for this property are acceptance, throughput, light grasp, light-gathering or -collecting power, optical extent, geometric extent, and the $A\Omega$ product. Throughput and $A\Omega$ product are especially used in radiometry and radiative transfer where it is related to the view factor (or shape factor). It is a central concept in non-imaging optics.

Etendue is a purely geometrical property and it is related to the beam divergence and the cross-section area of the beam. However the "term" etendue can be applied to both the optical beam passing through the projector or the optical path of the projector itself, as it will be discussed later on.

More precisely the etendue of a macroscopic beam of light rays at a certain position is formally defined by:

$$E = \iint n^2 \cos \theta \, dA \, d\Omega$$

Integration occurs over both the considered surface A and the considered solid angle $\Omega$. The angle $\theta$ is measured between $d\Omega$ and the surface normal of dA and n is of course the index of refraction.

For all 'normal' optical systems it can be demonstrated that the etendue of a beam travelling through the system is either preserved or increased but cannot decrease. On the other hand, an optical system will always have a single component (or a collection of components) that puts a maximum value on the etendue of the beam ($E_{max}$) that can still pass through it. This is the reason why we call the projection systems, etendue-limited systems. Consequently, if the etendue of the beam before that component is larger, part of the generated light in that beam is inevitably wasted somewhere downstream in the optical system.

Lambertial(ly). In the fashion of a Lambertian emitter.

Lambertian emitter. An emitter that radiates according to Lambert's cosine law.

Light Valve. Also known as spatial light modulator. In the text and claims the terms light valve and spatial light modulator are to be considered as synonymous. The spatial light modulator can be a reflective spatial light modulator. The term "reflective spatial light modulator" is to be understood as a spatial light modulator which modulates the light in reflective mode, e.g. using an addressable mirror, a series of mirrors as is found in the form of a rotating polygon or an array of individually addressable mirrors, more particular, mirroring elements being part of the light modulator mounted in the package of the housing.

A reflective spatial light modulating device may comprise different types of reflective light modulators, such as digital mirror device (DMD), a liquid crystal display (LCD) or a liquid crystal on silicon (LCOS). Preferably, the light modulators can be addressed on a pixel-by-pixel basis to thereby represent an arbitrary image of varying greyscale, e.g. video images. The DMD, also called digital mirror device or digital micro-mirror device, is a reflective spatial light modulator, comprising a semiconductor-based array of fast, reflective digital light switches that precisely control reflection of a light source using, for example, a binary pulse width modulation technique. A DMD has a matrix of a plurality of individually addressable and electrically deformable or moveable mirror cells. In a first state or position, each mirror cell of the digital mirror device acts as a plane mirror to reflect the light received to one direction, through a projection lens towards e.g. a projection screen, while in a second state or position they project the light received to another direction, away from the projection screen. In a reflective liquid crystal display (also known as LCOS) light valve, the light is not modulated by a mechanical displacement of a mirror, but by changing the polarization state of the liquid crystals in the light valve.

The light valve or spatial light modulator can also be transmissive. An example of transmissive spatial light modulator is a liquid crystal light valve. At least some embodiment of the present invention applies to transmissive spatial light modulator.

Luminance is a photometric measure of the luminous intensity per unit area of light travelling in a given direction. It describes the amount of light that passes through, is emitted from, or is reflected from a particular area, and falls within a given solid angle.

Brightness is the term for the subjective impression of the objective luminance measurement standard (see Objectivity (science) § Objectivity in measurement for the importance of this contrast).

The SI unit for luminance is candela per square meter ($cd/m^2$), as defined by the International System of Units (SI is from the French Système international d'unités) standard for the modern metric system. A non-SI term for the same unit is the nit.

Primary colour Primary color is a base color used when making a color image, with the property that it receives a separate image (pixels with varying values) modulation. There are "signal primaries", typically three: Red (R), Green (G), and Blue (B), because the images are typically coded in this way. And there are also display primaries, and these could be the same three: R,G,B (very commonly done). But there could also be more display primaries ("multi-primary displays"), i.e. a yellow primary could be added to R,G,B, for which then also a separate imager modulation is foreseen. In this example of a RGBY display architecture, a calculation has to be done on the signal primaries to derive values that will go to all the pixels of that added primary (yellow in this example).

Reflectivity (or average reflectivity) of the filter (in %) is the amount of light which is reflected by the filter with respect to the amount of incoming light. The reflectivity, or average reflectivity, is preferably defined over an incidence angle range in which light is reflected by the filter and over a wavelength range.

Transmission (or average transmission) of the filter (in %) is the amount of light which is transmitted by the filter with respect to the amount of incoming light. The transmission, or average transmission, is preferably defined over an incidence angle range and over a wavelength range.

Wavelength Conversion Material.

A.k.a. conversion material, down conversion material.

A wavelength conversion material or element can be a phosphor, for example a yellow phosphor, whose characteristics depend on the native colors the projection system shall provide. Quantum dots could be used as well as wavelength conversion elements, e.g. especially for lower power projectors.

The term "wavelength conversion material" as used herein relates to photoluminescence materials. The term "photoluminescence" as used herein relates to materials which encompass both fluorescence and/or phosphorescence materials, for instance phosphors and quantum dots are within the scope of this definition. The term "phosphor" as used herein relates to any material which is able to emit light by photoluminescence. Thus in the following reference to photoluminescent wheel includes individual and separate reference to photo luminescent wheel just as reference to photoluminescent material includes individual and separate reference to photoluminescent material.

Reference to a "region" of photoluminescent material refers to an area which comprises such material area covered by such a material.

The invention is described more fully hereinafter with reference to the accompanying drawings, in which embodiments of the invention are shown. In the drawings, the absolute and relative sizes of systems, components, layers, and regions may be exaggerated for clarity.

Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 4:
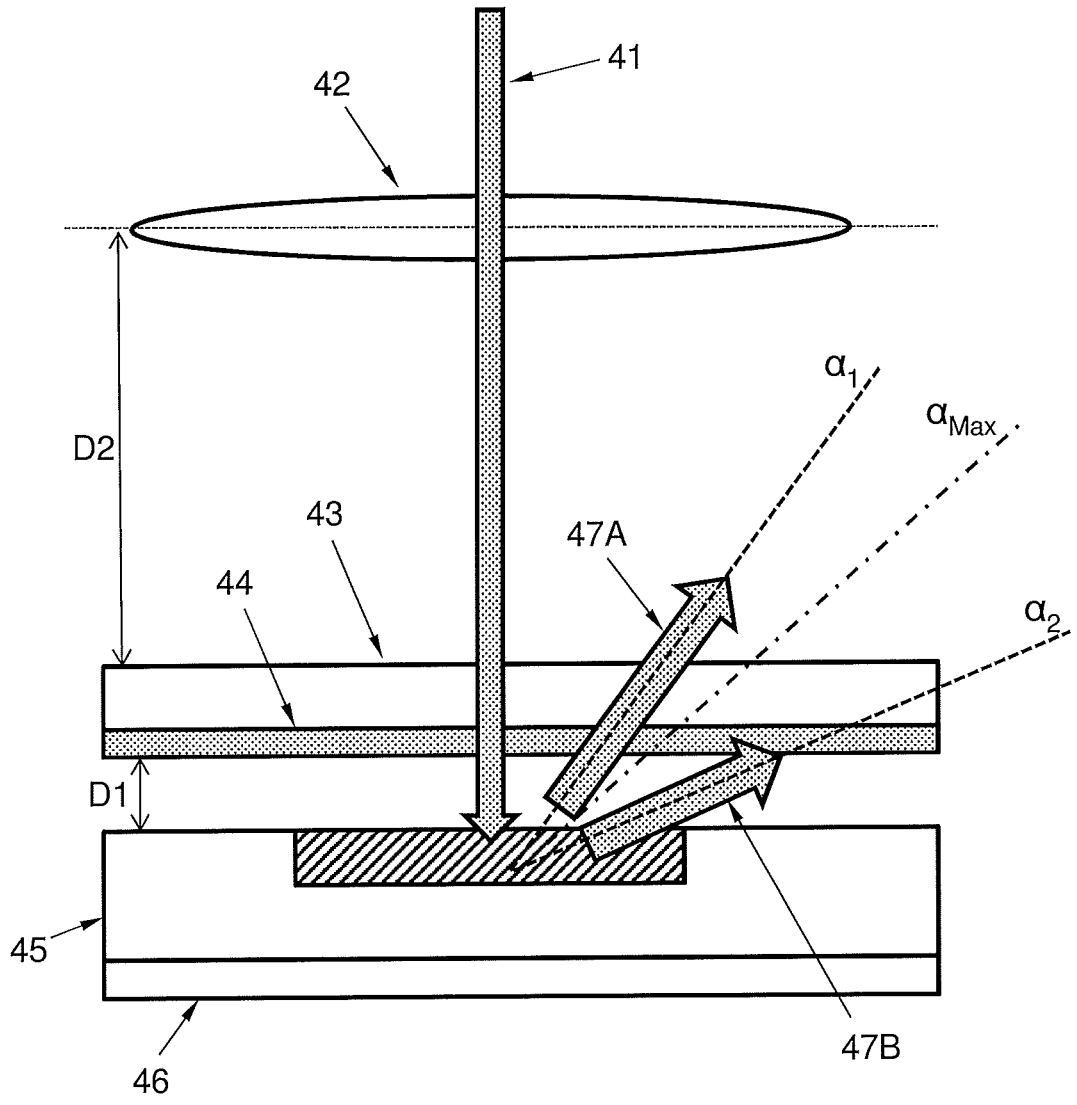
FIG. 4 shows an example of the optical portion responsible for generating the converted light beam, with the filter provided between the wavelength conversion material and the collection optics.

FIG. 4 illustrates a first example of a light engine, wherein an excitation light 41 passes a collection lens 42 and is directed towards a wavelength conversion material 45, for example a phosphor.

The excitation light can be blue or UV light emitted by a light source. The light source can be e.g. a laser light source, a LED light source or a lamp.

When a laser light source is used, the emission wavelengths are typically centered on 455 nm with a full width at half maximum equal to 5 nm for a blue laser. More generally, the center wavelength (i.e. dominant wavelength) of the blue laser light used for excitation of the wavelength conversion material can vary in the interval [420 nm-500 nm], or preferably in the interval [440 nm-470 nm], and even more preferably in the interval [450 nm, 460 nm] or [460 nm, 470 nm] and the full with at half maximum can vary from 1 nm to 30 nm.

The laser light source can also be provided by means of an array of laser diodes. Every laser diode has a wavelength spread (i.e. FWHM of 1 to 2 nm) itself, and production variations in dominant wavelength amongst different laser diodes are to be taken into account. If the excitation is done with blue LED, the distribution of excitation light can be substantially larger than 10 nm.

If UV light is used for the excitation of the wavelength conversion material, i.e. phosphor, the center wavelength of the UV laser light used for excitation of the phosphor can vary in the interval [350 nm-420 nm] and the full width at half maximum can vary from 1 nm to 30 nm.

The wavelength conversion material can be used in reflection or in transmission. In the present example, the wavelength conversion material is used in reflection.

The excitation light 41 impinges on the wavelength conversion material 45. In reflection, the wavelength conversion material 45, for example the phosphor can be supported by a substrate 46 that reflects both the excitation light 41 that impinges on it as well as light emitted by the phosphor layer 45. The substrate 46 can be e.g. a metal, such as Aluminium or a silver coated substrate, or even a substrate coated with a dichroic filter.

When excited, the wavelength conversion material, i.e. phosphor layer behaves like a Lambertian emitter. Because of the reflecting substrate 46, light (47A, 47B) exits the phosphor layer within an angle comprised in the interval $[-\pi/2, +\pi/2]$.

The type of wavelength conversion material used usually depends on the application. Phosphor is often used for the wavelength conversion material but other materials such as quantum dots, or quantum platelets can also be used for example.

When the wavelength conversion material is provided by a phosphor layer, the phosphor layer, which has a finite thickness, can be fixed, e.g. glued or soldered, on the reflective surface, as illustrated on FIG. 4.

For an RGB projector, the phosphor will be typically selected such that the light beam emitted by the phosphor comprises a waveband which includes at least one primary colour, such as red light or green light.

Figure 8:
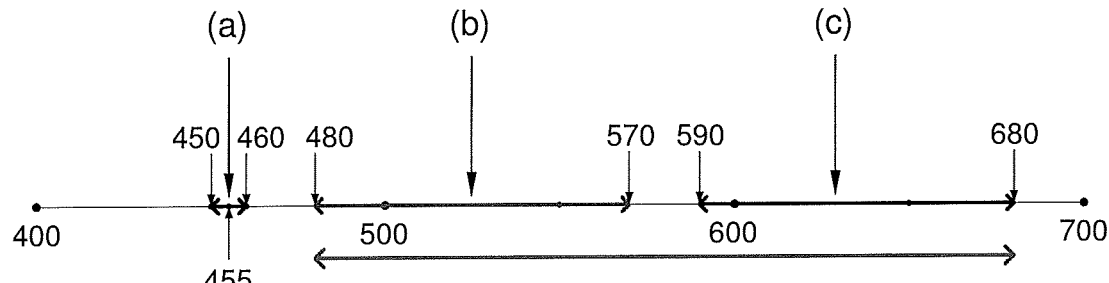
FIG. 8 shows an example of wavelength distribution/intervals for (a) the blue excitation light, (b) the light emitted by a green phosphor and, (c) the light emitted by a red phosphor.

FIG. 8 shows an example of wavelength distribution/intervals for (a) the blue excitation light, (b) the light emitted by a green phosphor and, (c) the light emitted by a red phosphor.

An example of red phosphor is: $(Ca,Sr,Ba)Si_2O_2N_2:Eu^{2+}$ or $CaAlSiN_3:Eu^{2+}$.

An example of green phosphor is of the type LuAG:Ce.

A yellow phosphor can also be used for an RGB projector. An example of a yellow phosphor is of the type YAG:Ce.

In order to reduce light losses, the light (47A, 47B) emitted by the wavelength conversion material 45 should be collected by using a set of lenses, named generically "the collection lens" 42. Because there is always a certain distance between the surface of the wavelength conversion material which emits light and the collection lens (especially in the solutions where the phosphor material is deposited on a spinning wheel), the light emitted at higher emission angles β will be lost (illustrated for example by light ray 47B having an emission angle $\beta_3$). The bigger the angle of the emitted light, the less efficient the lens will be to collect it. Therefore the collection lens is designed for a collection angle $(\alpha_{Max})$ smaller than 90°. A typical value for the collection angle $\alpha_M$, is in the range of for example 60° to 75°. If the collection lens 42 is designed for $\alpha_{Max}=60°$ for example, only approximately 66% of the light will be collected (geometrical and optical efficiency). The rest of the light is lost.

Therefore, an optical filter 44 is provided between the light collection optics 42 and the wavelength conversion material, i.e. phosphor layer 45. The filter 44 can be a diffraction filter like a Brag filter. The filter can be associated with a substrate 43, the substrate providing a mechanical support to the filter.

The filter 44 is an angle selective filter defined by an angle $\beta_2$. Light emitted by the wavelength conversion material 45 with an angle $\beta_3$ larger than $\beta_2$ is reflected by the filter 44 (back towards the wavelength conversion material 45). Light emitted by the wavelength conversion material 45 with an angle $\beta_1$ smaller than $\beta_2$ passes through the filter 44 and its substrate 43 and is collected by the collection lens 42, wherein $\beta_2$ should be smaller or equal to $\alpha_{Max}$.

The light collection optics is therefore configured simultaneously to illuminate the wavelength conversion material with the excitation light, and to collect light within an acceptance cone defined by the angle $\alpha_{Max}$ for receiving all the light emitted by the wavelength conversion material and transmitted by the filter, such that $\alpha_{Max} \geq \beta_2$ (to receive all of the light transmitted by the filter).

Therefore, the angle selective filter 44 should fulfil the following conditions:

A high average transmission (the average transmission can be larger than 80%, 90% or 95% and preferably larger than >98%) for a certain incidence angle and a wavelength band corresponding to the light 41 used for exciting the wavelength conversion material 45.

A high average reflectivity (the average reflectivity can be larger than 80%, 90% or 95% and preferably larger than >98%) for at least a portion of the wavelength interval of the light emitted by the wavelength conversion material within at least the acceptance cone of the collection lens. The wavelength interval having such a high average reflectivity may correspond to red and/or green channels in the projector and that is not within at least the acceptance cone of the collection lens $(\alpha_{Max})$. The important wavelength ranges of the red and green light emitted by the phosphor layer can be defined differently depending on the colour performance desired for the projector or the different application. As an example we can have for the red channel the interval from 590 nm to 680 nm and for the green channel the interval from 480 nm to 570 nm.

A high average transmission (the average transmission can be larger than 80%, 90% or 95% and preferably larger than >98%) for at least a portion of the wavelength interval of the light emitted by the wavelength conversion material within at most an angle $\beta_2$, wherein $\beta_2 \leq \alpha_{Max}$ the acceptance cone of the collection lens. This wavelength interval will depend on the application, type of projector, colour gamut, primary colour of the projector, etc. For example, this wavelength interval may correspond to the red and/or the green light emitted by the phosphor layer.

It is hereby considered that the absorption of such a filter is negligible.

Figure 5:
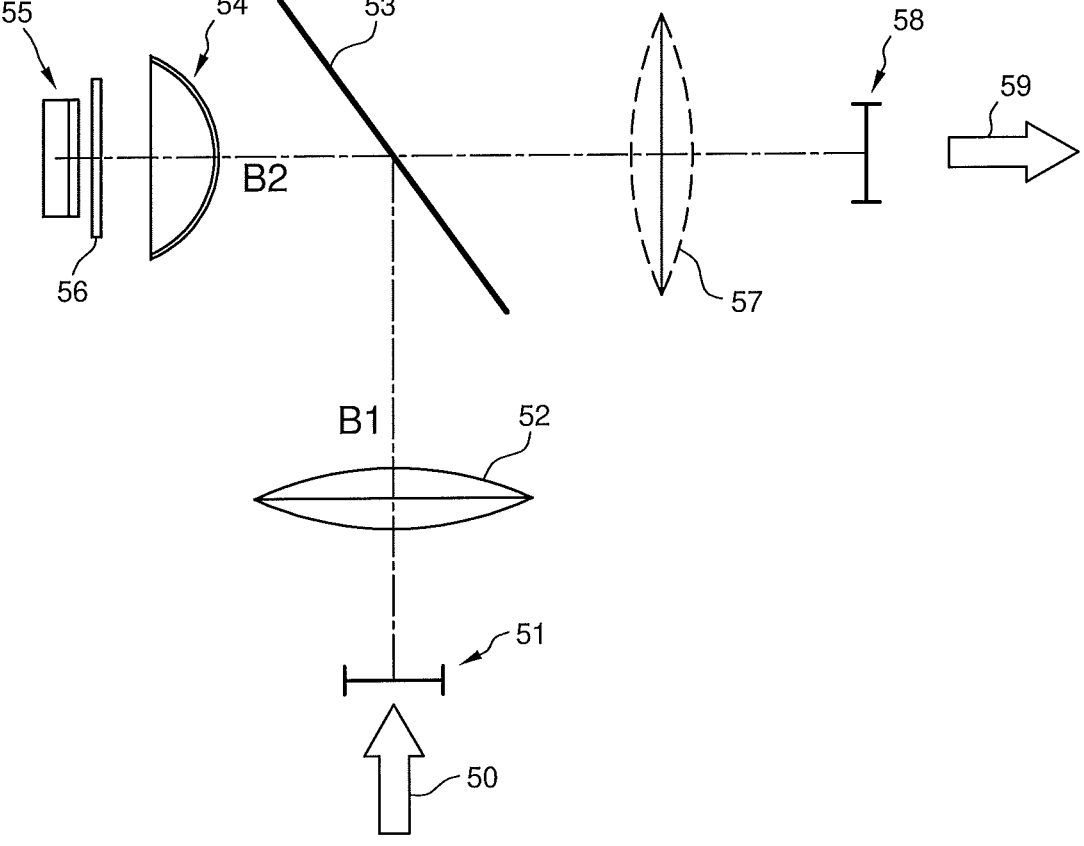
FIG. 5 shows an example of an optical layout for the arm generating the converted light beam, with auxiliary optics and dichroic mirror

FIG. 5 illustrates the optical path responsible for generating the converted light, which will contribute to the Green and/or Red channel of an RGB projector, by means of the wavelength conversion material and the excitation light source.

The excitation light source 50, for example a blue laser, emits a light beam B1 in the wavelength range 440-470 nm. Light beam B1 enters this module via the input interface 51. After a first reflection on a dichroic mirror 53 (which reflects the wavelengths emitted by the excitation light source), the light beam B1 goes through the collection optics 54 so that the light is concentrated on a small spot on the wavelength conversion element 55, after it has gone in transmission trough the angle selective filter 56. The light beam B1 may also go through a first auxiliary optics 52.

The wavelength conversion element 55 can be a green phosphor, a yellow phosphor, or a red phosphor as described above.

The wavelength converted light beam B2 emitted by the wavelength conversion element 55, under the emission angles that are transmitted by the angle selective filter, goes through the collection optics and is further directed, e.g. by means of dichroic mirrors 53 and optional auxiliary optics 57 to an output interface 58, to provide a converted light beam to the rest of the projection system.

The converted beam may be combined with other channels responsible for providing the other primary colours, to form a white beam, which after going through homogenization optics which serves to create a uniform rectangular white beam with a certain half cone angle, is imaged on the one or more light valves in the imager engine.

Figure 6:
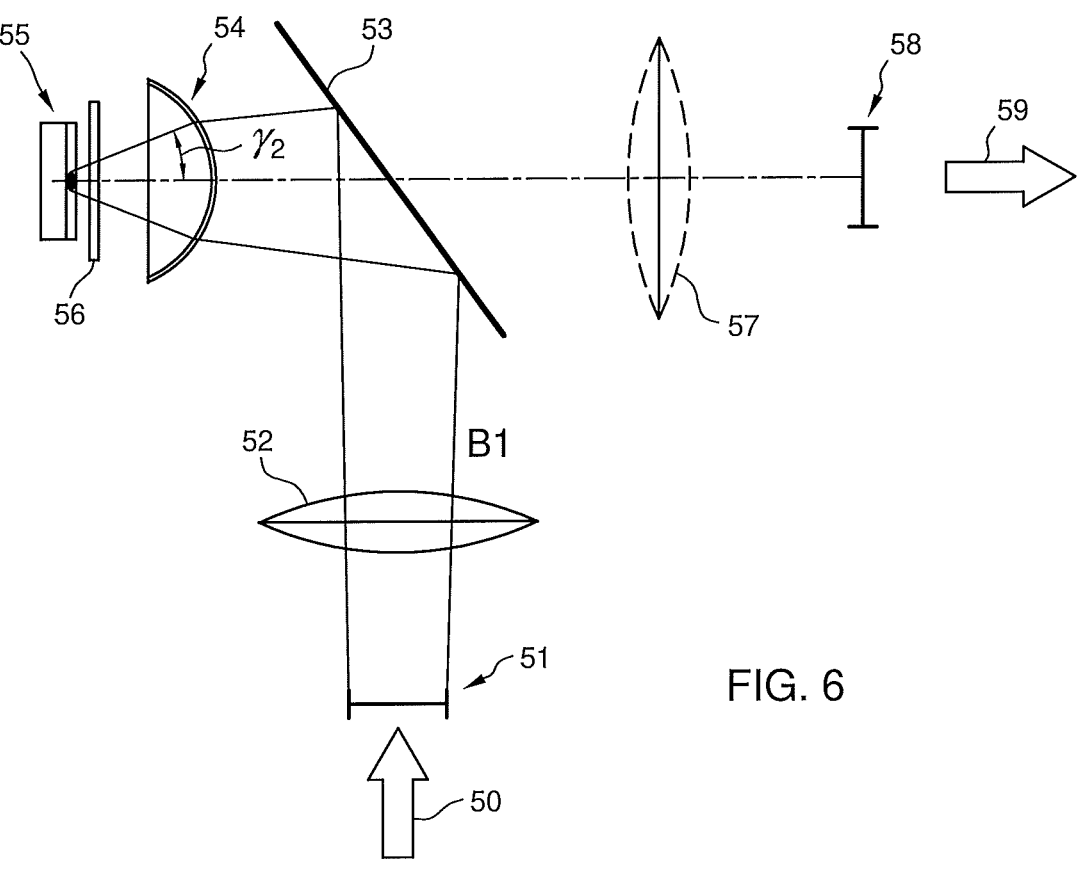
FIG. 6 shows the same layout as in FIG. 5, and illustrates the size of the excitation beam (shorter wavelengths) and incidence angle on the wavelength converting element.

FIG. 6 illustrates the beam B1 which corresponds to the excitation light. After a first reflection on the dichroic mirror 53, it impinges on the wavelength conversion material. The angle $\gamma_2$ illustrates the maximum incidence angle of beam B1 onto the wavelength conversion material, after going through light collection optics 54. The collection optics 54 and the auxiliary optics 52 in the excitation light leg of the system can make a demagnified image of the input interface at the surface of the wavelength conversion material.

Figure 7:
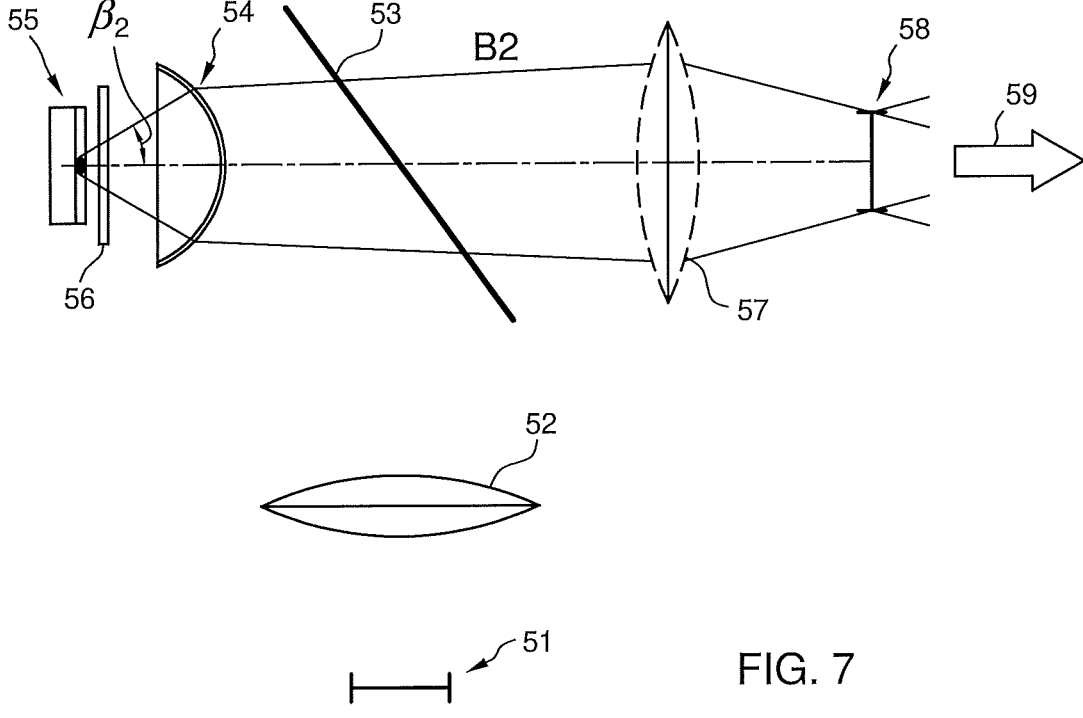
FIG. 7 shows the same layout as in FIG. 5, and illustrates the size of the converted beam (longer wavelengths) and emitting angle on the wavelength converting element.

FIG. 7 illustrates the beam B2 reflected by the wavelength conversion material (provided on a reflection surface). Light B2 reflected by the reflection surface and wavelength conversion material within a cone defined by the angle $\beta_2$ is directed towards the output interface, said reflected light being the converted light beam B2. The collection optics 54 cooperate together with the auxiliary optics (optional) 57 in the path of the converted light B2 to arrive at the output interface 58 of the illumination module.

The maximum incidence angle of the incoming excitation light on the angle selective filter ($\gamma_2$, see FIG. 6) is substantially smaller than the maximum emission angle for the converted light collected by the collection optics on the angle selective filter ($\beta_2$, see FIG. 7).

This can be realized by optimizing the beam size, or the etendue of the light generated by the excitation light source. A careful optical design of the excitation light source can be provided, such that at the interface of the phosphor layer, there is a low enough product of the beam size and its solid divergent angle, which can be realized by using laser light and e.g. combination techniques for bringing the laser beams from e.g. laser diodes very close to each other ("knife edging"). This is indicated by a smaller input interface 51 than the output interface 58 in FIGS. 5 to 7. In other terms, the etendue of the excitation light beam B1 is smaller than the etendue of the converted beam B2. In order to reduce the spread, it is important to provide an excitation light beam which has the smallest possible etendue.

In other words, the purpose of the filter is to change the emission property of the wavelength conversion material, by making it more directional. Thus, the major part of the light is only found back in a smaller half cone angle, for example 45°, which corresponds to the angle $\beta_2$ via recuperation of the high-angled light. In that case the collection lens can collect a smaller angle and the collection lens can be made more simple, such that it is smaller and for example no aspheric surfaces are needed. It is also particularly advantageous when the phosphor is provided on a spinning wheel as the collection lens can be located, further away from the spinning wheel, etc.

Furthermore, reducing the emission angle $\beta_2$ of the converted light beam B2 reduces the power density on the wavelength conversion material, e.g. phosphor, while the illumination light spot on the surface of the wavelength conversion material can be made bigger, for an identical light output, or in other words for the same etendue. The used etendue at the phosphor spot and on the light valve should be the same, and reducing the emission angle $\beta_2$ on the wavelength conversion material allows to proportionally increase the illumination spot size at the surface of the wavelength conversion material, while still having the same etendue In order to comply with the above requirements, a multi layer band pass filter which optimizes a well defined merit function, should be designed. A merit function which takes into account the requirements of the filter can be expressed as follows:

$$G = \frac{\int_{\lambda_1}^{\lambda_2} F(\lambda)P(\lambda)d\lambda}{\int_{\lambda_1}^{\lambda_2} P(\lambda)d\lambda} \times T_{\lambda_{ex}},$$

$$\text{wherein } T_{\lambda_{ex}} = \frac{\int_{\gamma_1}^{\gamma_2} T(\lambda_{ex}, \theta)\sin(\theta)d\theta}{\int_{\gamma_1}^{\gamma_2} \sin(\theta)d\theta} \text{ and}$$

$$(\lambda) = \frac{\dfrac{\int_{\beta_1}^{\beta_2} T(\lambda, \theta)\cos(\theta)\sin(\theta)d\theta}{\int_{\beta_1}^{\beta_2} \cos(\theta)\sin(\theta)d\theta}}{\dfrac{\int_{\beta_2}^{\beta_3} T(\lambda, \theta)\cos(\theta)\sin(\theta)d\theta}{\int_{\beta_2}^{\beta_3} \cos(\theta)\sin(\theta)d\theta}},$$

wherein $T_{\lambda_{ex}}$ represents the average transmission within the cone of light whose incidence angle is in the range $[\gamma_1,\gamma_2]$. F (A) is a wavelength dependent figure of merit defined by the ratio of the average transmission within the first range of incident angles $[\beta_1,\beta_2]$ and the average transmission in the second range of incident angles $[\beta_2,\beta_3]$, and wherein $\beta_1<\beta_2<\beta_3$.

$P(\lambda)$ is the spectral density. The spectral density is the spectral density of the light emitted by the wavelength conversion material, and further filtered and used downstream in the projector for providing an image on a screen. The wavelength conversion material emits light in a first spectral range with a spectral density profile. The projector will filter it further towards the light that is used in one or more of the "primary colors". For instance, the wavelength conversion material is a phosphor which emits yellow light Ph($\lambda$) within a range from 500 to 650 nm, but the projector can only use the part from 520 to 580 nm for the primary color (in this case green channel) by applying an "engine filter" E($\lambda$). In that case, the spectral density to be considered, P($\lambda$) is, P($\lambda$)=Ph($\lambda$)×E($\lambda$), as this is the spectral density of the light which is contributing to the final image projected on the screen.

When the filter is to be used in a projector, wherein the light path dedicated to the wavelength conversion material is similar to the one shown on FIG. 7, the angles have preferably the following values.

In general, $\gamma_1$=0, such that the excitation light source illuminates the wavelength conversion element orthogonally. However, it is also possible to provide an optical design wherein the excitation light source impinges on the wavelength conversion element at an angle, in which case $\gamma_1 \neq 0$.

In general, $\beta_1$=0, such that light reflected at an incidence angle of 0 degrees is transmitted, however, it is also possible to provide a different design, depending on the projector for example.

Similarly, in general $\beta_3$=90°, such that light which is reflected on the sides of the wavelength conversion element is not transmitted (and reflected), however, again, a different design is also possible, depending on the projector for example.

Furthermore, it is preferable that the angle $\alpha_{Max}$ defining the acceptance cone of the light collection optics is greater or equal to the angle $\beta_2$ of the filter, and is preferably equal to the angle $\beta_2$ of the filter.

The angle $\beta_2$ of the filter is in the range of [0°, 65°], preferably substantially 45°. Therefore, the angle $\alpha_{Max}$, which should be at least $\beta_2$, is preferably at least 45° up to 60° or 75°. The main requirement on the angle $\alpha_{Max}$ is that it collects as much as possible of the reflected light.

Preferably, the angle $\gamma_2$ is substantially smaller than $\beta_2$, as described above. The angle $\gamma_2$ is preferably substantially in the range [10°, 35°]. However, this angle range depends on the optical design of the illumination part.

The filter can for instance be a multi-layer Distributed Bragg Reflector (DBR). As illustrated in FIG. 4, the distance D1 between the filter 44 and the emitting area of the wavelength conversion element is an important parameter to consider as it will influence the efficiency of the system.

As shown in FIG. 4, the filter 44 can be deposited (coated) on a glass or fused silica or any other transparent material (in the visible range). This material, or substrate 43 is preferably placed as close as possible to the emission area of the surface of the wavelength conversion material.

The filter can also be deposited (coated) directly on the surface of the wavelength conversion material.

Figures 9A, 9B, 9C:
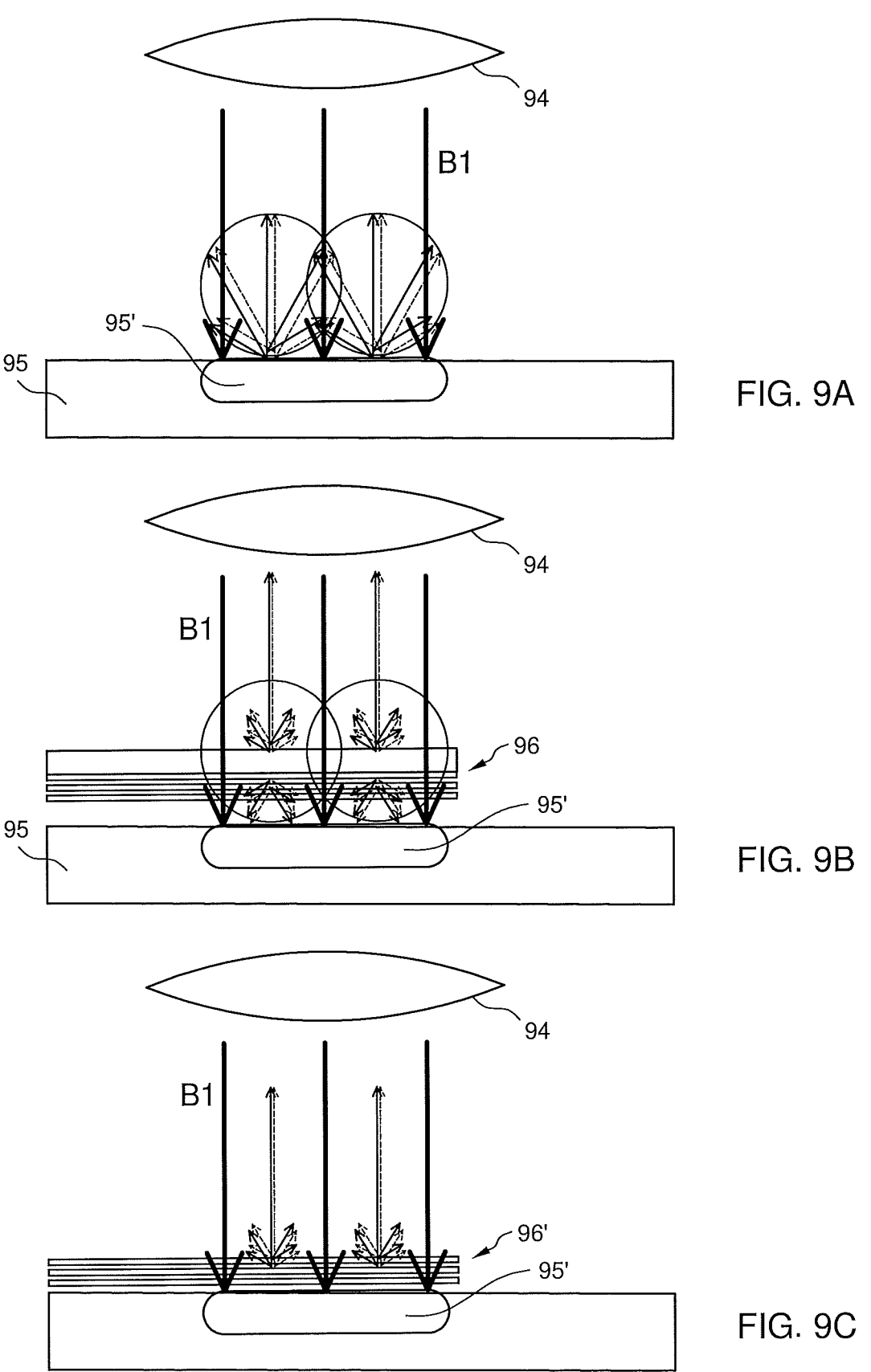
FIG. 9 shows schematically the scattering of light after (a) emission by a yellow phosphor, (b) after emission by a yellow phosphor and being reflected back and transmitted by the filter provided at a distance from the phosphor, (c) after emission by a yellow phosphor and being reflected back and transmitted by the filter provided on the phosphor.

FIGS. 9a, 9b, and 9c illustrate the different possible arrangements. In this example the wavelength conversion material 95 is a phosphor.

In FIG. 9a, the phosphor emission, which escapes from the excitation zone 95', follows a Lambertian pattern. Light reemitted at an angle larger than $\alpha_{Max}$ escapes and is lost.

In FIG. 9b, the filter 96 is deposited on a transparent substrate, as shown in FIG. 4. The Lambertian emission has now become directional thanks to the filter. The reflection of the light rays emitted at an angle larger than $\beta_2$ can be seen on the figure, due to the distance between the filter and the surface of the wavelength conversion material.

In FIG. 9c, the filter 96' is coated directly on the surface of the phosphor. The light rays emitted by the wavelength conversion material, after reflection are also not Lambertian but directed towards the collection lens.

The distance (D1 on FIG. 4) between the filter and the surface of the wavelength conversion material is preferably less than 5 mm, even more preferably less than 2 mm, and even more preferably less than 1 mm.

In order to reduce the light losses, it is important to keep the emission area constant. However the emitting area of a phosphor layer is directly linked to the illumination area and the illumination area will increase due to the reflected light bouncing back and forth between the filter and the phosphor if the distance from filter to phosphor is not infinitesimally small.

If the distance between the filter and the surface of the wavelength conversion material is zero, than the illumination area will not increase at all. Hence the emitting area will not increase at all.

From a theoretical point of view, in order to minimize this distance, the best implementation is to have the filter directly deposited on the phosphor. Because the filter should work for a broad range of angles and wavelengths, a large number of layers is required to obtain an efficient solution.

The inventors have implemented such a filter with 11 layers, as described hereunder.

An example of a method to produce such a filter is hereby described. This method has been tested and a filter has been produced with the method outlined.

A Distributed Bragg Reflector (DBR) is a multilayer structure with alternately layers of high and low refractive indices: $n_h$ and $n_l$. The refractive indices are slowly decreasing with the wavelength. The wavelength range with high average reflectivity or stop band results from constructive interference of light reflected from the interfaces. For high average reflectivity around $\lambda_c$ for perpendicular incidence, the layer thicknesses should be $d_i=\lambda_c/4n_1$ wherein $n_i$ is the corresponding refractive index. For this case, the peak reflectivity is given by (C. Sheppard, Pure and Applied Optics: Journal of the European Optical Society Part A 4, 665 (1995)):

$$R_{HR,max} = \left( \frac{1 - \left(\frac{n_s}{n_a}\right)\left(\frac{n_h}{n_l}\right)^{2N}}{1 + \left(\frac{n_s}{n_a}\right)\left(\frac{n_h}{n_l}\right)^{2N}} \right)^2$$

where $n_s$ is the refractive index of the substrate, $n_a$ that of the surrounding ambient (air), and N is the number of pairs. It can be seen that increasing the number of layers and the contrast between the refractive indices increases the reflectivity. In this way peak reflectivity exceeding 99% can be achieved (M. Muallem, A. Palatnik, G. D. Nessim, and Y. R. Tis-chler, ACS applied materials & interfaces 7, 474 (2014).

DBRs can be fabricated using different kinds of materials, for example organic polymers, semiconductors or metal derivatives. Different processes can be used to deposit DBR layers, such as chemical vapor deposition, sol-gel, sputtering and electron-beam evaporation.

Due to their high reflectivity and low losses, DBRs have been widely used in many areas like optical filters, micro-cavities, vertical-cavity surface-emitting lasers, photonic crystals, organic light emitting diodes and enhancement of emitting efficiency. A disadvantage of the DBR is that the high reflectivity is often limited to near-normal incidence and to a limited wavelength interval, although more complex designs are possible.

For the realization of such a filter, suitable materials are for example titanium dioxide ($TiO_2$) and silicon dioxide ($SiO_2$) because of the large refractive index contrast and the stability of the materials. Other materials can also be used. Evaporated $TiO_2$ may suffer from strong absorption in the visible wavelength range and has a refractive index lower than the reported crystalline value.

The first step to produce such a filter is to select two materials having a large refractive index contrast, such as $SiO_2$ and $TiO_2$. These materials are then deposited by electron beam evaporation in vacuum on unheated substrates without additional oxygen ambient. Si wafers and glass substrates can be cleaned in ultrasonic baths with subsequently acetone, IPA and deionized water. The deposition rate and total thickness can be monitored by a quartz crystal sensor, by measuring the change in resonance frequency.

This can be followed by an annealing procedure in a tube furnace with oxygen content to improve reduce the absorption of visible light by $TiO_2$.

For the fabrication of the DBR, the procedure for the deposition of the layers is repeated, with a particular thicknesses for each layer. The annealing procedure is conducted after every deposition of $TiO_2$.

The angle and wavelength dependency of the fabricated DBR reflectivity can then be measured and compared to numerical simulations.

A specific DBR with different angle and wavelength dependency for different wavelength ranges with the following requirements has been simulated and produced as an example:

for a first wavelength range having a narrow blue range (450 nm to 460 nm) with low (average) reflectivity for an incidence angle $\gamma < 22°$ (this angle is defined by the optical design of the light source);

for a third wavelength range in the green (510 nm $< \lambda <$ 545 nm), a low (average) reflectivity (high (average) transmission) for incidence angles $\beta < 45"$ and high (average) reflectivity (low (average) transmission) for incidence angles $\beta$ above $\beta_2 = 45°$. It is to be noted that the range for the third wavelength range strongly depends on the application. In other applications, this range can be broader 500 nm $< \lambda <$ 590 nm.

Plane wave optical simulations for transmission on a multilayer have been carried out to determine the DBR optimal structure.

Figure 11:
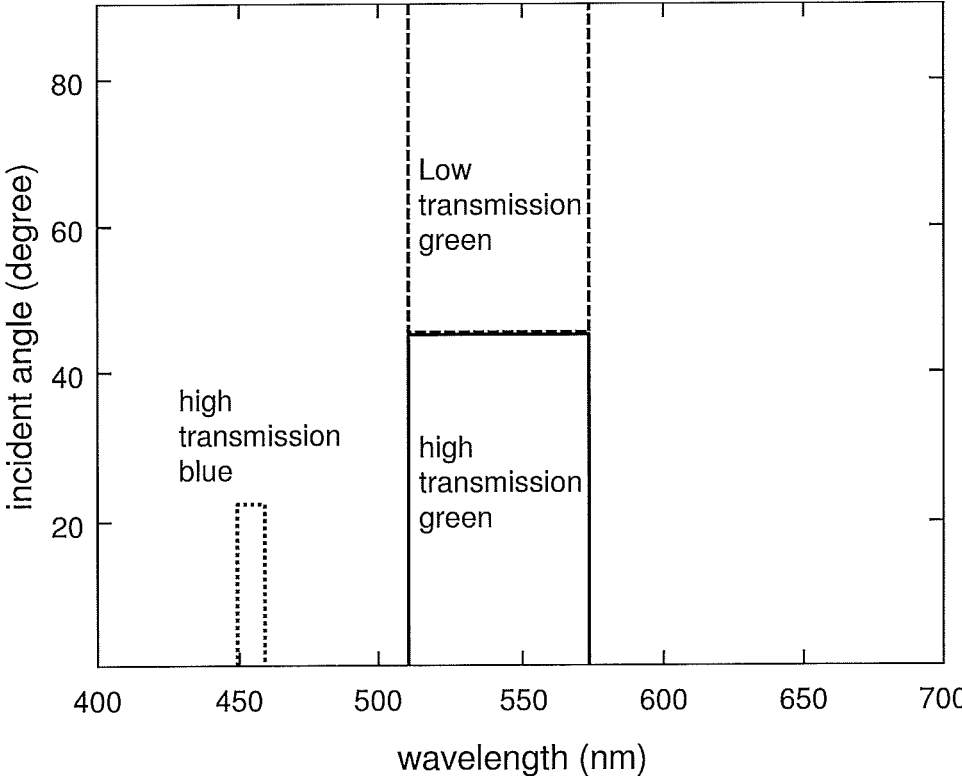
FIG. 11 illustrates in a diagram the requirements on transmission properties of the filter as a function of the wavelength and the incidence angle.
Figure 15:
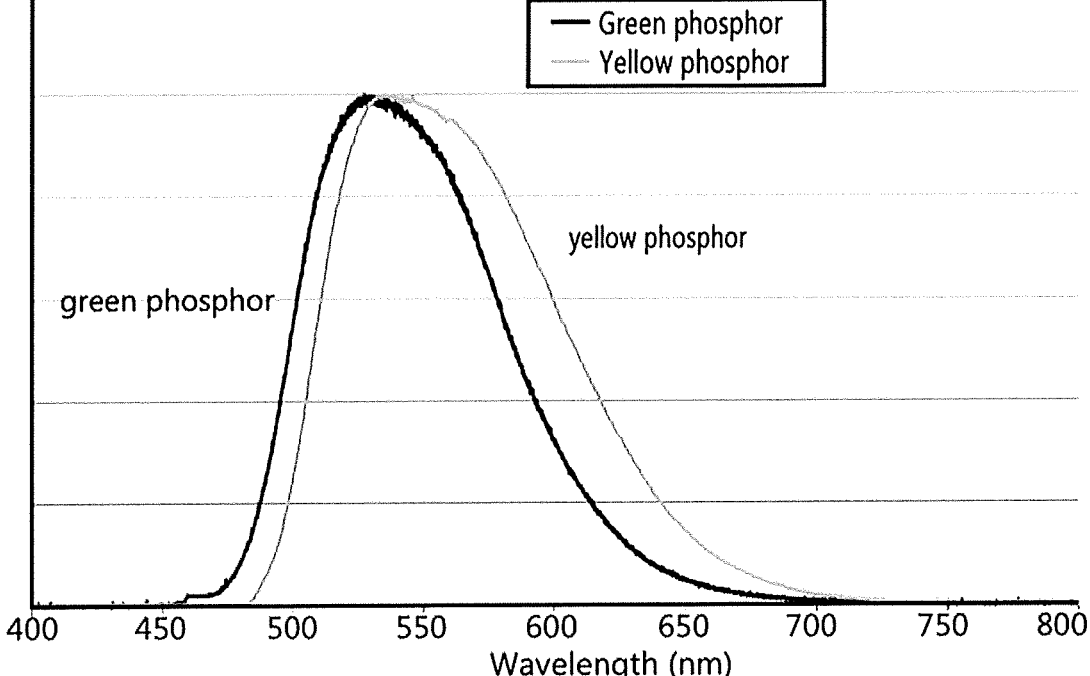
FIG. 15 shows an example of an optical spectrum of a typical green phosphor and a typical yellow phosphor.

FIG. 11 illustrates an example of such a filter. The filter is optimized to be combined with a wavelength conversion material which is a green phosphor re-emitting light in the following range [450, 700] nm. An example of a spectrum of light emitted by a green phosphor is shown on FIG. 15.

Because the filter is designed to have very high average transmission (>98%) for the excitation wavelength, the light from the blue lasers used to excite the phosphors will be transmitted with minimum losses.

In order to obtain a well-defined optimization of the DBR design, a figure of merit which takes into account the different requirements is to be defined.

Because the blue spectral range for high transmission is narrow only the middle of the wavelength interval, namely 455 nm, is considered. The average transmission within the cone with half angle 22° is defined by $$T_{blue} = \frac{\int_0^{22°} T(455 \text{ nm}, \theta)\sin(\theta)d\theta}{\int_0^{22°} \sin(\theta)d\theta}.$$

For the green transmission range, the wavelength-dependent figure of merit $F(\lambda)$, defined as the ratio of the average transmission within the cone $\beta \leq 45°$ over the average transmission out of the cone (with $45° \leq \beta \leq 90°$), simplifies to $$F(\lambda) = \frac{\int_0^{45°} T(\lambda, \theta)\cos(\theta)\sin(\theta)d\theta}{\int_{45°}^{90°} T(\lambda, \theta)\cos(\theta)\sin(\theta)d\theta}.$$

Figure 12:
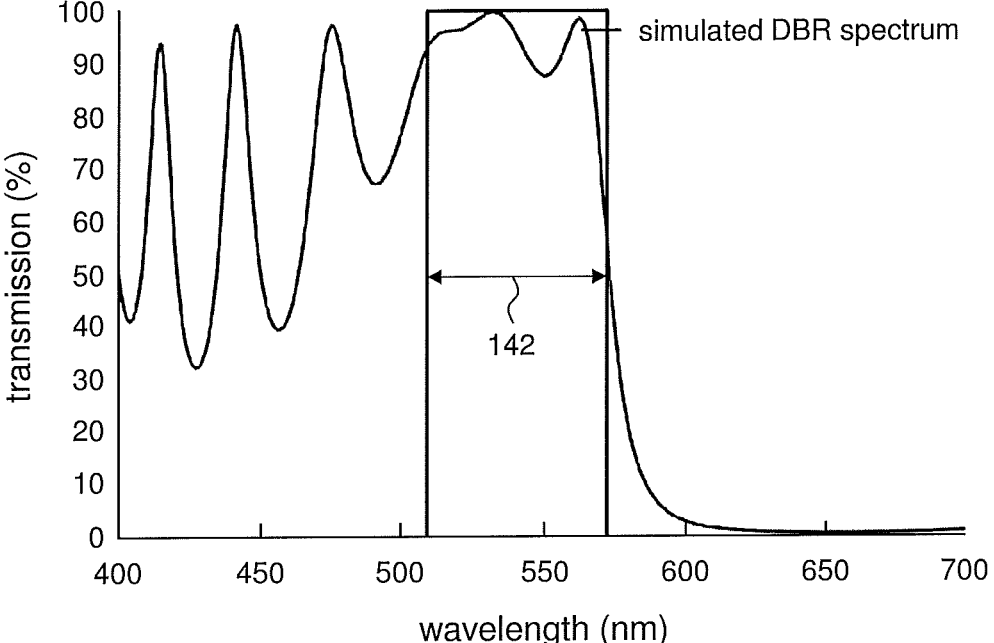
FIG. 12 illustrates the transmission spectrum of a simulated DBR obtained after a first iteration, based only on normal incidence. The green range indicates the FWHM of the spectrum.

A specific green spectrum $P(\lambda)$ with wavelength range between 500 nm and 590 nm, full width half maximum (FWHM) 142 around 64 nm with a central wavelength at 542 nm, as shown in FIG. 12.

The figure of merit G for the DBR is then found by averaging the factor F defined above weighted with the spectral density P(A) and multiplying with the factor $T_{blue}$ above, such that:

$$G = \frac{\int_{\lambda_1}^{\lambda_2} F(\lambda)P(\lambda)d\lambda}{\int_{\lambda_1}^{\lambda_2} P(\lambda)d\lambda} \times T_{blue}.$$

For a conventional DBR, high reflectivity is obtained for a certain wavelength $\lambda$ when the layer thicknesses are equal to a quarter-wavelength for the respective refractive indices ($d_i = \lambda_c/4n_i$). A high reflectivity for the green region when the angle $\beta$ is above $\beta_2 = 45°$ is desired. For a DBR with high reflectivity for a given wavelength and inclination angle $\theta$, the thicknesses of each layer should be increased according to $d_i = \lambda/(4n_i \cos \theta_i)$. The inclination angle $\theta$ corresponds to the angle $\beta$.

The transmission $T(\lambda, \theta)$ for a given multilayer stack can be calculated based on the scattering matrix method, taking into account the interference of plane waves due to partial reflections at all interfaces (L. Penninck, P. De Visschere, J. Beeckman, and K. Neyts, Optics express 19, 18558 (2011).) Each layer is defined by its (real) refractive index and its thickness.

The inventors have found that a multi-layer filter comprising 11 layers is a good compromise for obtaining a filter with the desired requirements to demonstrate the concept. As known to the skilled person, the more layers a multi-layer filter comprises, the better are the requirements obtained by such a filter. For example, such a filter may comprise tens of layers.

The merit function defined above is optimized for an eleven-layer stack of $TiO_2$ and $SiO_2$ on a glass substrate. Because of the vast size of an 11-dimensional parameter space, it is important to start the optimization from a realistic estimation. For the first estimation, an initial thicknesses (quarter wavelengths) designed to obtain high reflectivity (and low transmission) around 550 nm with incident angle 60° can for example be selected. Thus, with a normal incidence, the reflection at around 550 nm will be low (high transmission).

Figure 14:
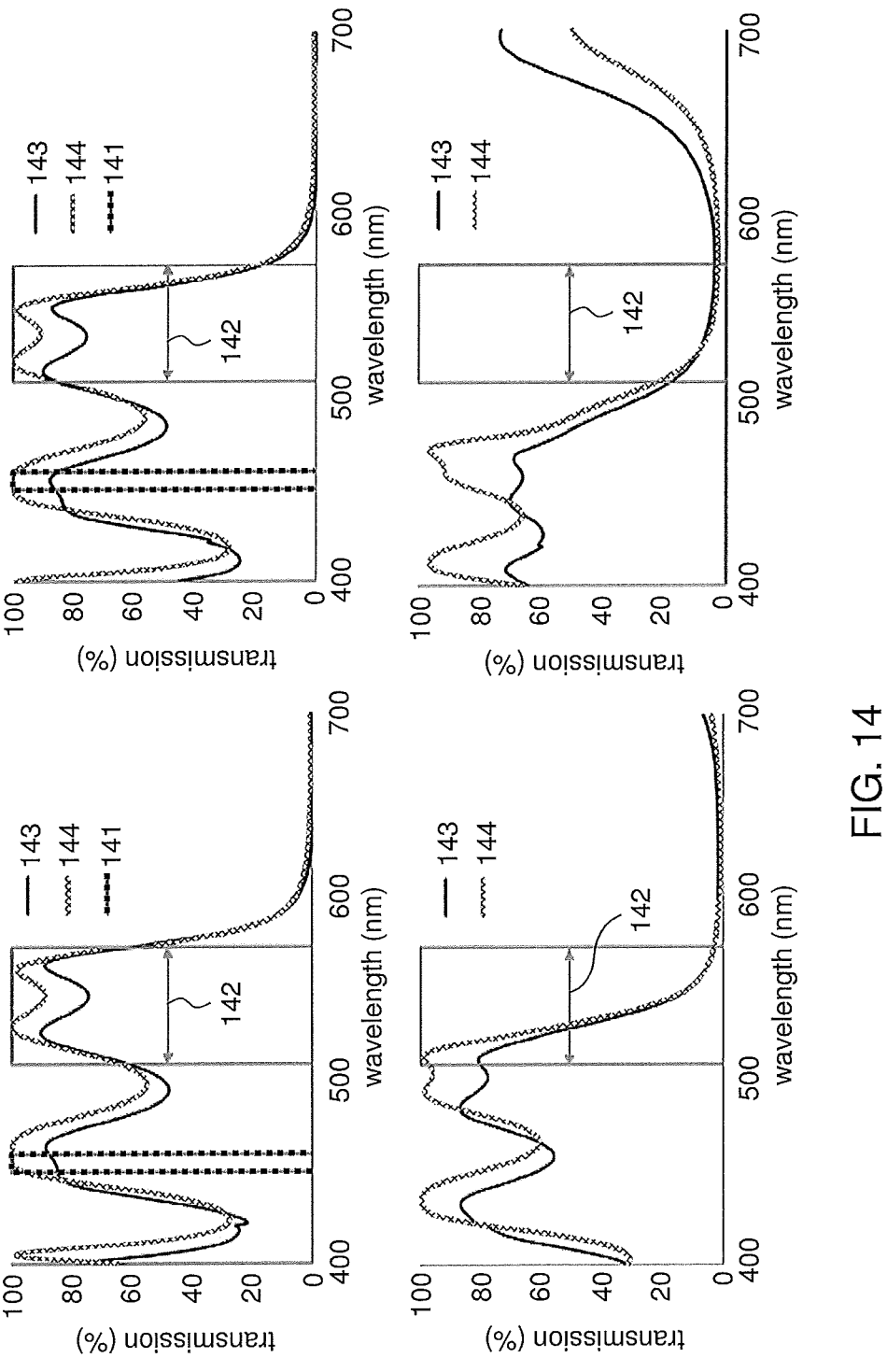
FIG. 14 illustrates the experimental and simulated transmission spectra (400 nm to 700 nm) of a fabricated DBR for different angles of incidence (a) normal incidence (b) $\theta=20°$ (c) $\theta=40°$ (d) $\theta=60°$. The rather big drop in transmission under large incident angle is caused by the reflection of the compensating glass substrate in the holder.

In a simple DBR spectrum, the transmission peak is very narrow, compared to the FWHM of the required green range (63.5 nm). To fulfill the requirements of a broad high transmission green band as well as a high reflection green band at inclination incidence, the transmission peak just next to the reflection band needs to be broadened, thus the thickness of the layers in the stack are varied in a first iteration process. FIG. 12 shows the resulting transmission spectrum in the perpendicular direction after this first iteration. The figure shows indeed maxima around 550 nm. The FWHM is indicated by numeral 142. Corresponding thickness for each layer after the first iteration is shown in table 1, in the second row, hereunder. For this DBR stack, the calculated value of G is only 0.3, which is low because up to now only the transmission for normal incidence for the optimization has been considered.

trum. A good agreement between the two curves indicates that fabricated layers can be used for the fabrication of the filter. In fact, the peaks and valleys happen at the same wavelengths, and the curves substantially match in general transmission value, with a reason for potential deviations. For instance it is known that there is more absorption especially in blue, and thus that there can be less transmission or reflection than predicted in the model in that wavelength region. Spectral transmission of the fabricated filter has been measured for different inclination angles with a spectrophotometer with a holder designed for oblique incidence, which contains two rotatable sample holders. As the test sample holder is oriented with a certain angle, a second glass substrate under the opposite angle is used to compensate the lateral displacement caused by the inclined test sample. FIG. 14 shows a comparison between the experi-

TABLE 1

| Designed DBR parameters (thickness in nm) | | | | | | | | | | | | |
| --- | --- | --- | --- | --- | --- | --- | --- | --- | --- | --- | --- | --- |
| | $TiO_2$ | $SiO_2$ | $TiO_2$ | $SiO_2$ | $TiO_2$ | $SiO_2$ | $TiO_2$ | $SiO_2$ | $TiO_2$ | $SiO_2$ | $TiO_2$ | G | $T_{blue}$ |
| 1st | 186 | 128 | 64 | 123 | 64 | 128 | 64 | 131 | 64 | 128 | 186 | 0.3 | 40.4% |
| Opt | 73.3 | 133.9 | 58.2 | 153.9 | 42.8 | 135.0 | 47.4 | 166.5 | 44.5 | 150.8 | 65.5 | 0.85 | 99.86% |

Starting from the first iteration, the DBR can further be adjusted by optimizing the figure of merit G mentioned above. For a DBR with m layers, it means to find the optimized G value in a m-dimension space, where the variables are the thickness for the m layers.

To find the 11 layer thicknesses that maximize the value of G, an optimization algorithm is executed. For example, a gradient method can be implemented in an eleven-dimensional space. For each layer i, the difference in G is calculated when the thickness of this layer is incremented with a small amount $\Delta d$ (e.g. 1 nm) as in the equation hereunder. The gradient method provides the direction of steepest ascent to maximize the value of G.

$$gradG_i = \frac{G(d_{old}, i + \Delta d) - G(d_{old}, i)}{\Delta d}$$

The equation under can be used to adjust the different layers thickness, where $\Delta d'$ determines the magnitude of the thickness changes.

$$d_{new,i} = d_{old,i} + \Delta d' \times \frac{gradG_i}{\|G\|}$$

Figure 13:
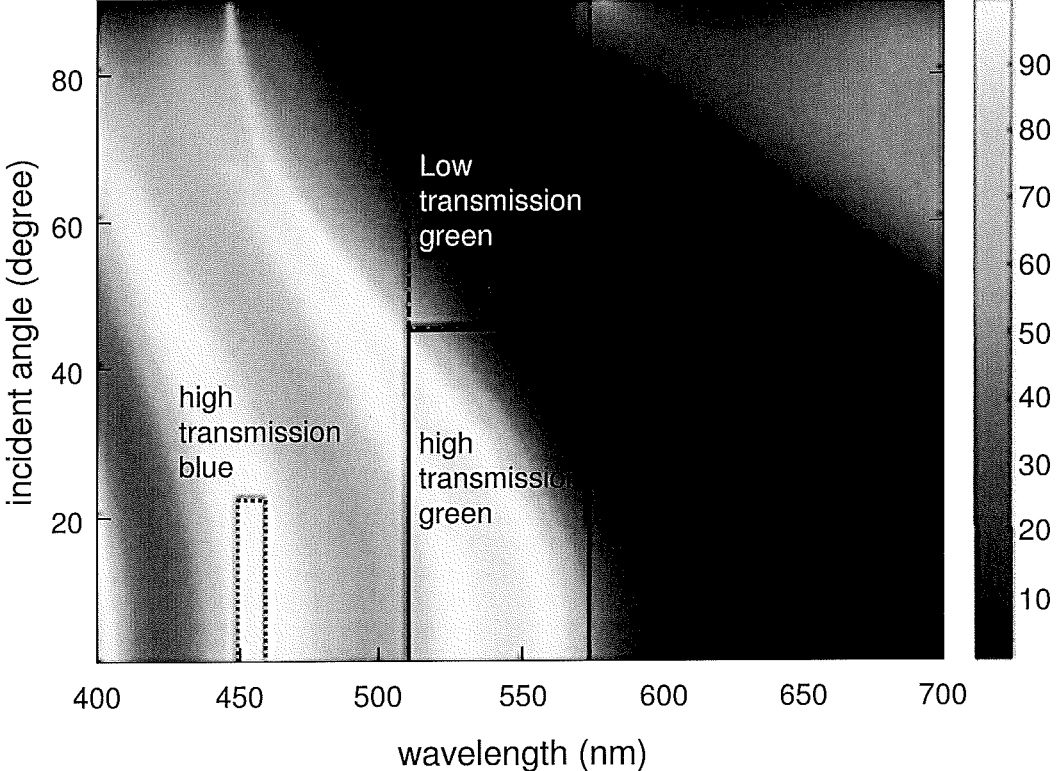
FIG. 13 shows the simulated angle and wavelength dependency of the transmission of the designed DBR with 11 layers, with indication of the three target ranges.

After a number of iterations, in which the step size $\Delta d'$ is gradually reduced, the optimized set of layer thicknesses and the corresponding value of G are found. For a DBR with 11 layers, the optimized design is shown in table 1, third row. The angle and wavelength dependency of the transmission is shown in FIG. 13. The corresponding factor G is equal to 0.85 and $T_{blue}$ is equal to 99.86%. This is a considerable improvement compared to the first iteration.

A device has been fabricated according to the design of table 1 with eleven layers of $TiO_2$ and $SiO_2$, following the procedure described above. It is important to deposit the layers with accurate thicknesses in order to obtain a good result. In order to ensure that the fabricated thicknesses are sufficiently precise, the measured spectrum for normal incidence can be compared to the simulated transmission specmental and simulated transmission spectra of the fabricated DBR filter according to the above requirements. Reference numeral 143 indicates the measurement and 144 the simulation. The target green region with FWHM 142 and the 455 nm blue wavelength 141 are also shown. The curves represent measurements and simulations at different angles of incidence. Figure a) is at normal incidence, b) at θ=20°, c) at θ=40°, and d) at θ=60°. The correspondence between measurements 143 and simulations 144 stays good. With the increase in inclination angle, the transmission window shifts to shorter wavelengths, just as the theory suggests. For the green spectrum of interest, the transmission is high for small angles of incidence and low for 60° of incidence, as expected. For an inclination angle of 40° about half of the light is transmitted. Note that the measured transmission is typically somewhat lower than the simulated value. This is partly due to the reflection at the glass/air interface, which is not taken into account in the simulations. In addition there may be a small amount of absorption or scattering in the experimental samples.

Comparison between simulated and measured transmission spectra, at different inclination angles, indicates that the DBR operates according to the optimized design. Green light is well transmitted for inclination angles below 45°, and well reflected for inclination angles above 45°. Blue light ranges from 450 nm to 460 nm is well transmitted for inclination angles below 22°. The figure of merit G for the designed filter is 0.85 for this specific design.

The reflection and transmission efficiencies can be improved by increasing the number of layers in the filter.

The exact wavelength and angle behaviour can be optimized by changes in the material used (the refractive index) and the thicknesses as known in the art.

Figure 16:
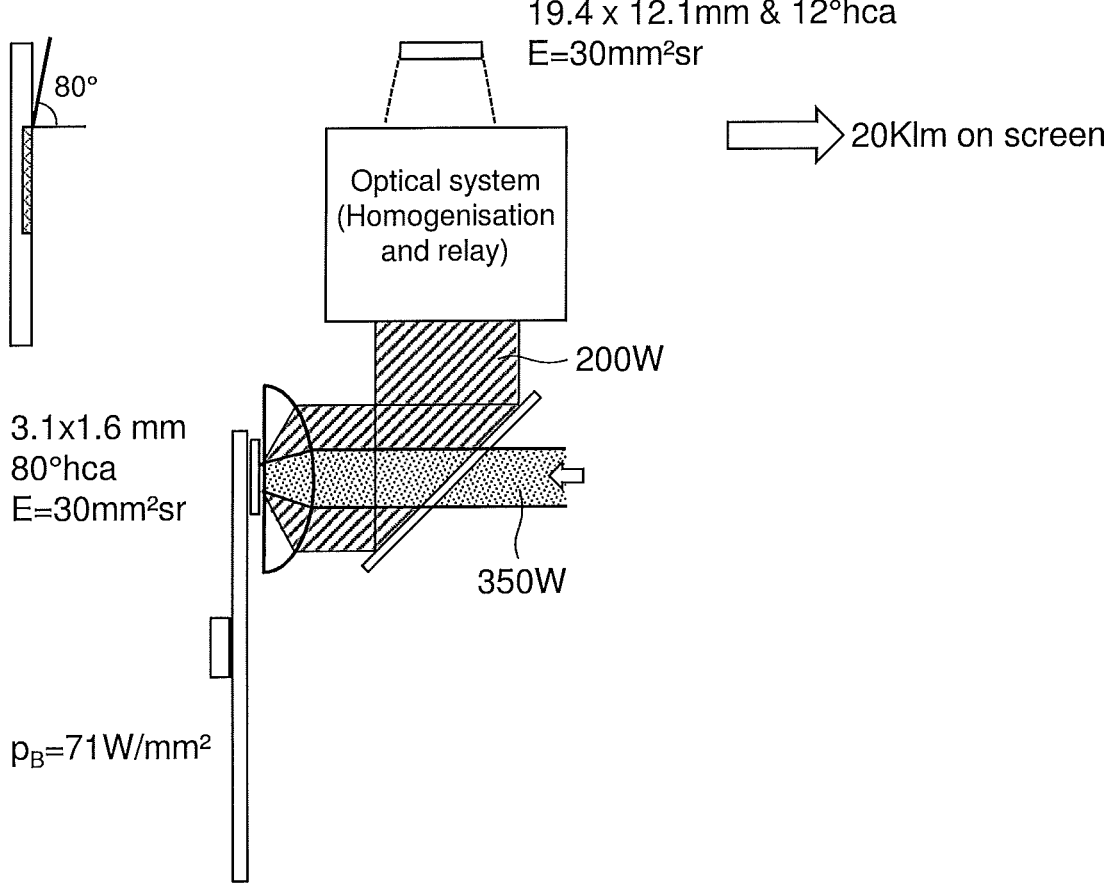
FIG. 16 illustrate a system without a filter.
Figure 17:
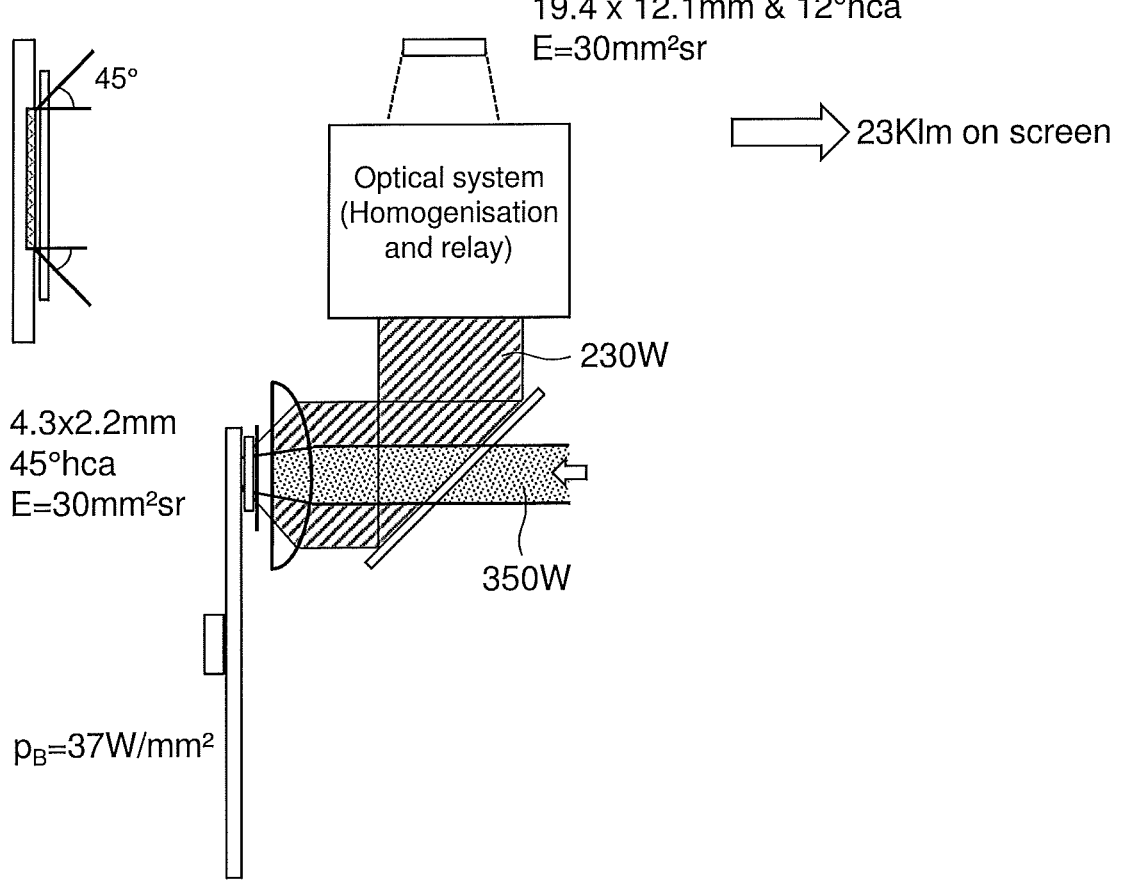
FIG. 17 illustrate a system with a filter.

FIGS. 16 and 17 illustrate a system with and without the filter as described above, respectively.

In FIG. 16, because the optical system with homogenisation is designed to preserve the etendue as much as possible, it can be calculated the size of the spot required for illuminating a 0.9" DMD imager with f/2.5 illumination (12° half cone angle), which is 30 mm² sr etendue. On the phosphor with 80° half cone angle emission this means a spot size of 3.1×1.6 mm is matched. Some example power levels are indicated for a case of 20 Klm (20000 lm) on the screen. The blue illumination on the phosphor is 71 W/Mm², which is high. The phosphor could lose conversion efficiency (e.g. Quenching) or have a more limited lifetime.

On the contrary, in FIG. 17, the phosphor is now more directive because a filter as described above is added, so the full stack operates according to the invention emitting only light in 45° half cone angle. The spot on the phosphor can now be bigger for the same etendue. The illumination power density can be lower, which is beneficial for the efficiency of the phosphor conversion. The collection lens in front of the phosphor can also be simpler because it has to process smaller angles, and therefore be more efficient and compact. This is one way of getting an optical design which is advantageous. Another way is to increase the power density of blue e.g. up to 650 W, so that the power density $p_B \sim 71$ W/mm² again, and the total light output on screen could be increased to 37 Klm (37000 lumen).

Such a filter is not trivial to design and produce. In fact, as explained throughout the application, such a filter has both good transmission in the wavelength range for low incidence angles of the "excitation light" (blue light, i.e. 445-465 nm) and an angle selective behaviour for the "wavelength converted light" as emitted by the phosphor (e.g. green, or yellow, or red light, . . . in general i.e. from 500 nm up to 650 nm), so that there is high transmission for low incident angles and high reflectivity for high incident angles. This filter can be seen as a "coupled design", as it solves simultaneously two problems with a single component. Furthermore, solving these two problems with a single component has the additional advantage of providing a system wherein the etendue at the surface of the wavelength converting element is identical to the etendue on the light valve of the projector. A system wherein these two components are separate would not be so efficient, compact and reduce light losses as described above.

The full system, thus the filter plus its positioning closer to reflective phosphor module, produces a gain of luminance (or radiance) into the selected angle range with respect to the traditional system of a reflective (Lambertian emitting) phosphor module alone. The luminance of the source after applying the filter and in the transmissive angular region (the lower angles) produces more luminance than when the filter is not applied. The luminance in the selected limited angular range (the lower angles) can thus be increased.

The wavelength ranges for the reflectivity of the filter can depend on the type of projector (e.g. 1 light valve vs 3 light valves) and the colour performance (colour points, colour to white ratio etc.) but also on the manufacturability of the filter.

The narrower the wavelength range the easier it will be to have a filter with high transmission/reflectivity and steep transition between the light reflected and the light transmitted for example.

The invention claimed is:

1. An angle selective filter for a light projection system comprising a wavelength conversion material provided on a reflective surface, an excitation light source emitting light in a first wavelength range, the excitation light source being configured to illuminate the wavelength conversion material, the wavelength conversion material re-emitting light in a second wavelength range after excitation by the light in the first wavelength range, wherein said re-emitted light is re-emitted in reflection by the reflective surface, and a light collection optics configured to receive at least a portion of the light re-emitted by the wavelength conversion material within an acceptance cone defined by an angle $\alpha_{Max}$, wherein the filter is to be provided in the light path between the light collection optics and the wavelength conversion material, wherein the filter is configured to have a first average transmission which is high for light in the first wavelength range and for angles of incidence in the range $[\gamma_1, \gamma_2]$, in a third wavelength range, the filter is configured to have a second average transmission which is high for light having an incidence angle in the range $[\beta 1, \beta 2]$, and a third average reflectivity which is high for light having an incidence angle in the range $[\beta 2, \beta 3]$, after reflection on the wavelength conversion material, and wherein $\gamma_2$ is substantially smaller than $\beta_2$.

2. The filter according to claim 1, wherein the first average transmission is larger than 80% such that $$T_{\lambda_{ex}} = \frac{\int_{\gamma_1}^{\gamma_2} T(\lambda_{ex}, \theta)\sin(\theta)d\theta}{\int_{\gamma_1}^{\gamma_2} \sin(\theta)d\theta} \geq 80\%.$$

3. The filter according to claim 1, wherein the second average transmission is larger than 80% such that $$\frac{\int_{\beta_1}^{\beta_2} T(\lambda, \theta)\cos(\theta)\sin(\theta)d\theta}{\int_{\beta_1}^{\beta_2} \cos(\theta)\sin(\theta)d\theta} \geq 80\%, 90\%, 95\% \text{ or } 98\%.$$

4. The filter according to claim 1, wherein the third average reflectivity is larger than 80% such that $$\frac{\int_{\beta_2}^{\beta_3} R(\lambda, \theta)\cos(\theta)\sin(\theta)d\theta}{\int_{\beta_2}^{\beta_3} \cos(\theta)\sin(\theta)d\theta} \geq 80\%.$$

5. The filter according to claim 1, wherein at least one of the angle $\gamma_1$ is 0, $\beta_1$ is 0, and $\beta_3$ is 90°.

6. The filter according to claim 1, wherein the angle $\alpha_{Max}$ defining the acceptance cone of the light collection optics is greater or equal to the angle $\beta_2$ of the filter.

7. The filter according to claim 1, wherein the incidence angle 12 is in the range [0°, 35°].

8. The filter according to claim 1, wherein the third wavelength range is a subset of the second wavelength range.

9. The filter according to claim 8, wherein the third wavelength range is defined by the wavelength range of at least one of the green or red primary colour of the projection system.

10. The filter according to claim 1, wherein the filter is coated on a second side of a transparent substrate, wherein the transparent substrate is configured such that a first side faces the light collection optics, and the second side faces the wavelength conversion material.

11. The filter according to claim 10, wherein the filter is provided in the projection system at a distance D1 from the surface of the wavelength conversion material, wherein the distance D1 is at most 5 mm.

12. The filter according to claim 1, wherein the filter is coated on top of the wavelength conversion material.

13. The filter according to claim 1, wherein the excitation light source is at least one of a laser light source.

14. The filter according to claim 13, wherein the first wavelength range is in the interval [420 nm-500 nm], and the full width at half maximum is in the range of 1 nm to 30 nm, or wherein the first wavelength range is in the interval [350 nm-420 nm] and the full width at half maximum is in the interval of 1 nm to 30 nm.

15. The filter according to claim 1, wherein the wavelength conversion material is a photoluminescent material of the type LuAG:Ce or of the type nitride or oxynitride.

16. The filter according to claim 1, wherein the wavelength conversion material comprises quantum dots or quantum platelets.

17. An illumination source for a projector system comprising:

an excitation light source emitting light in a first wavelength range, a wavelength conversion material provided on a reflective surface, the excitation light source being configured to illuminate the wavelength conversion material, the wavelength conversion material re-emitting light in a second wavelength range after excitation by the light in the first wavelength range, wherein said re-emitted light is re-emitted in reflection, a light collection optics configured to receive at least a portion of the light re-emitted by the wavelength conversion material within an acceptance cone defined by an angle $\alpha_{Max}$, and a filter according to claim 1 provided in the light path between the light collection optics and the wavelength conversion material.

18. The light projection system comprising the filter according to claim 1 or an illumination source comprising:

an excitation light source emitting light in a first wavelength range, a wavelength conversion material provided on a reflective surface, the excitation light source being configured to illuminate the wavelength conversion material, the wavelength conversion material re-emitting light in a second wavelength range after excitation by the light in the first wavelength range, wherein said re-emitted light is re-emitted in reflection, a light collection optics configured to receive at least a portion of the light re-emitted by the wavelength conversion material within an acceptance cone defined by an angle $\alpha_{Max}$, and a filter according to claim 1 provided in the light path between the light collection optics and the wavelength conversion material.

* * * * *